US009822015B2

(12) United States Patent
Shimano et al.

(10) Patent No.: US 9,822,015 B2
(45) Date of Patent: Nov. 21, 2017

(54) METHOD FOR PRODUCING LITHIUM COMPOSITE METAL OXIDE, LITHIUM COMPOSITE METAL OXIDE, AND NONAQUEOUS ELECTROLYTE SECONDARY BATTERY

(75) Inventors: Satoshi Shimano, Tsukuba (JP); Kenji Nakane, Tsukuba (JP); Cedric Pitteloud, Saint-Louis (FR); Kenji Takamori, Tsukuba (JP); Yuichiro Imanari, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 178 days.

(21) Appl. No.: 13/513,885

(22) PCT Filed: Dec. 2, 2010

(86) PCT No.: PCT/JP2010/072070
§ 371 (c)(1),
(2), (4) Date: Jun. 5, 2012

(87) PCT Pub. No.: WO2011/071094
PCT Pub. Date: Jun. 16, 2011

(65) Prior Publication Data
US 2012/0244413 A1  Sep. 27, 2012

(30) Foreign Application Priority Data

Dec. 7, 2009 (JP) ................................. 2009-277249
Oct. 19, 2010 (JP) ................................. 2010-234215
Oct. 19, 2010 (JP) ................................. 2010-234216

(51) Int. Cl.
H01M 4/525 (2010.01)
H01M 4/52 (2010.01)
H01M 4/485 (2010.01)
H01M 4/48 (2010.01)
C01G 1/02 (2006.01)
H01M 4/505 (2010.01)
C01G 45/12 (2006.01)
C01G 51/00 (2006.01)
C01G 53/00 (2006.01)

(52) U.S. Cl.
CPC ........... *C01G 1/02* (2013.01); *C01G 45/1228* (2013.01); *C01G 51/50* (2013.01); *C01G 53/50* (2013.01); *H01M 4/505* (2013.01); *H01M 4/525* (2013.01); *C01P 2002/54* (2013.01); *C01P 2006/12* (2013.01); *C01P 2006/40* (2013.01)

(58) Field of Classification Search
None
See application file for complete search history.

(56) References Cited

U.S. PATENT DOCUMENTS

| 5,626,635 | A | 5/1997 | Yamaura et al. | |
|---|---|---|---|---|
| 2009/0104530 | A1 | 4/2009 | Shizuka et al. | |
| 2009/0104531 | A1* | 4/2009 | Tanino | H01M 4/136 429/223 |
| 2011/0059363 | A1 | 3/2011 | Imanari et al. | |
| 2011/0151329 | A1* | 6/2011 | Bernard | H01M 4/32 429/223 |
| 2011/0256442 | A1* | 10/2011 | Kageira | H01M 4/0404 429/144 |

FOREIGN PATENT DOCUMENTS

| CN | 149522 | * | 5/2004 | ............. C01B 13/14 |
|---|---|---|---|---|
| CN | 1493522 | A | 5/2004 | |
| EP | 1372202 | A1 | 12/2003 | |
| JP | 8-222220 | A | 8/1996 | |
| JP | 10-324521 | A | 12/1998 | |
| JP | 2001-64020 | A | 3/2001 | |
| JP | 2001-302245 | A | 10/2001 | |
| JP | 2003-068306 | | * | 3/2003 ............. H01M 4/58 |
| JP | 2003-68306 | A | 3/2003 | |
| JP | 2003-92108 | A | 3/2003 | |
| JP | 2003068306 | | 3/2003 | |
| JP | 2003-151546 | A | 5/2003 | |
| JP | 2005-141983 | A | 6/2005 | |

(Continued)

OTHER PUBLICATIONS

English translation of JP 2008-305777.*
English translation of JP 2003-068306.*
Machine-generated English translation of JP 2003-068306 published Mar. 7, 2003, to Mitsubishi Chemicals Corp.
Machine-generated English translation of JP 2001-302245 published Oct. 31, 2001 to Toyota Central Research & Development Lab., Inc.
Machine-generated English translation of JP 10-324521 published Dec. 8, 1998, to Ube Industries, Ltd.
Machine-generated English translation of JP 2001-064020 published Mar. 13, 2001 to Mitsui Mining & Smelting Co., Ltd.
Machine-generated English translation of JP 2003-092108 published Mar. 28, 2003 to Mitsubishi Chemicals Corp.

(Continued)

Primary Examiner — Yoshitoshi Takeuchi
(74) Attorney, Agent, or Firm — Sughrue Mion, PLLC

(57) ABSTRACT

The present invention provides a method of producing a lithium mixed metal oxide, a lithium mixed metal oxide and a nonaqueous electrolyte secondary battery. The method includes a step of calcining a mixture of one or more compounds of M wherein M is one or more elements selected from the group consisting of nickel, cobalt and manganese, and a lithium compound, in the presence of one or more inactive fluxes selected from the group consisting of a fluoride of A, a chloride of A, a carbonate of A, a sulfate of A, a nitrate of A, a phosphate of A, a hydroxide of A, a molybdate of A and a tungstate of A, wherein A is one or more elements selected from the group consisting of Na, K, Rb, Cs, Ca, Mg, Sr and Ba. The lithium mixed metal oxide contains nickel, cobalt and manganese, has a BET specific surface area of from 3 $m^2/g$ to 15 $m^2/g$, and has an average particle diameter within a range of 0.1 μm or more to less than 1 μm, the diameter determined by a laser diffraction scattering method.

5 Claims, No Drawings

(56) References Cited

FOREIGN PATENT DOCUMENTS

| JP | 2007-091573 | * | 4/2007 | ............. C01G 53/00 |
| JP | 2007-091573 A | | 4/2007 | |
| JP | 2008-305777 | * | 12/2008 | ............. H01M 4/50 |
| JP | 2008-305777 A | | 12/2008 | |
| JP | 2008305777 | | 12/2008 | |
| JP | 2009-32655 A | | 2/2009 | |
| JP | WO 2010/074293 | * | 7/2010 | ............ H01M 4/131 |
| WO | 2009/005164 A1 | | 1/2009 | |
| WO | WO 2010/023531 | * | 3/2010 | ............. C01G 51/00 |

OTHER PUBLICATIONS

Machine-generated English translation of JP 2003-151546 published May 23, 2003 to Nichia Chemical Industries, Ltd.
Japanese Office Action issued in corresponding JP Application No. 2010-270204, dated Aug. 5, 2014.
Japanese Office Action issued in corresponding JP Application No. 2010-270205, dated Aug. 5, 2014.
Chinese Office Action issued in corresponding CN Application No. 201080054435.4, dated Sep. 10, 2014.
Chinese Office Action issued in corresponding CN Application No. 201080054435.4, dated Mar. 25, 2014.
Chinese Office Action issued in CN Application No. 201080054435.4, dated Jul. 23, 2013.

* cited by examiner

METHOD FOR PRODUCING LITHIUM COMPOSITE METAL OXIDE, LITHIUM COMPOSITE METAL OXIDE, AND NONAQUEOUS ELECTROLYTE SECONDARY BATTERY

CROSS REFERENCE TO RELATED APPLICATIONS

This application is a National Stage of International Application No. PCT/JP2010/072070 filed on Dec. 2, 2010, which claims priority from Japanese Patent Application Nos. 2009-277249, filed on Dec. 7, 2009, 2010-234215 filed Oct. 19, 2010 and 2010-234216 filed Oct. 19, 2010, the contents of all of which are incorporated herein by reference in their entirety.

TECHNICAL FIELD

The present invention relates to a method of producing a lithium mixed metal oxide, a lithium mixed metal oxide and a nonaqueous electrolyte secondary battery.

BACKGROUND ART

A lithium mixed metal oxide has been used as a positive electrode active material for a nonaqueous electrolyte secondary battery such as a lithium secondary battery. The lithium secondary battery has already been put into practical use as a small-sized power supply for use in portable telephones, notebook personal computers, etc., and has also been tried to be applied to a middle-sized to large-sized power supply for use in automobiles, power storage, etc.

As a method of producing a lithium mixed metal oxide, a method of calcining a mixture obtained by mixing a mixed hydroxide containing nickel and cobalt with lithium hydroxide has been proposed (for example, Patent Document 1, etc.).

Further, a method of calcining a mixture obtained by mixing a mixed hydroxide containing nickel, cobalt and manganese with lithium hydroxide has also been proposed (for example, Patent Document 2, etc.).

As a conventional lithium mixed metal oxide, Patent Document 3 has disclosed a lithium mixed metal oxide having an average particle diameter of 0.17 μm in primary particles, a BET specific surface area of 4.67 m²/g, and a median diameter of 11 μm in secondary particles, and being represented by the formula $Li_{1.05}Ni_{0.45}Mn_{0.45}Co_{0.10}O_2$. This lithium mixed metal oxide is obtained by a method in which a slurry containing $Ni(OH)_2$, $Mn_3O_4$ and $Co(OH)_2$ is spray-dried to obtain a granulated powder, the granulated powder and an LiOH powder are mixed to obtain a mixture, and then the mixture is calcined.

PRIOR ART DOCUMENTS

Patent Documents

[Patent Document 1]: JP8-222220A
[Patent Document 2]: JP2007-091573A
[Patent Document 3]: JP2005-141983A

DISCLOSURE OF THE INVENTION

A nonaqueous electrolyte secondary battery, prepared using a lithium mixed metal oxide obtained by calcining the above-mentioned mixture, still has some room for improvement in charging/discharging behaviors on its discharge capacity (hereinafter, may be sometimes referred to as cycle behavior) at the time when charging and discharging operations are repeatedly performed.

In the Case where the cycle behavior is unstable, it is difficult to adjust the balance of discharge capacity between a positive electrode and a negative electrode, which causes deposition of the dendrite of lithium metal on the electrode surface, with the result that the safety of a battery may be finally impaired in some cases.

An object of the present invention is to provide a nonaqueous electrolyte secondary battery having improved secondary battery characteristics such as cycling behavior, and also to provide a lithium mixed metal oxide suitable for the secondary battery and a method of producing the same.

The present invention provides the following <1> to <20>.

<1> A method of producing a lithium mixed metal oxide, the method comprising a step of calcining a mixture of one or more compounds of M wherein M is one or more elements selected from the group consisting of nickel, cobalt and manganese, and a lithium compound, in the presence of one or more inactive fluxes selected from the group consisting of a fluoride of A, a chloride of A, a carbonate of A, a sulfate of A, a nitrate of A, a phosphate of A, a hydroxide of A, a molybdate of A and a tungstate of A, wherein A is one or more elements selected from the group consisting of Na, K, Rb, Cs, Ca, Mg, Sr and Ba.

<2> The method according to <1>, wherein the produced lithium mixed metal oxide is represented by the following formula (1):

$$Li_aMO_2 \qquad (1)$$

wherein M is one or more elements selected from the group consisting of nickel, cobalt and manganese, and $0.9 \leq a \leq 1.3$.

<3> The method according to <1> or <2>, wherein the inactive flux is a carbonate of A or a chloride of A or both.

<4> The method according to any one of <1> to <3>, wherein A is Na or K or both.

<5> The method according to any one of <1> to <4>, wherein the lithium compound is lithium carbonate.

<6> The method according to any one of <1> to <5>, wherein the above-described one or more compounds of M are one or more hydroxides of M.

<7> The method according to any one of <1> to <6>, wherein the inactive flux is present in an amount of from 0.1 parts by weight to 400 parts by weight per 100 parts by weight of the lithium compound at the commencement of the calcination.

<8> The method according to any one of <1> to <7>, wherein a temperature of the calcination is within a range of from 200° C. to 1150° C.

<9> The method according to <1>, wherein one or more compounds of M include, as a whole, nickel, cobalt, and manganese.

<10> The method according to <9>, wherein the produced lithium mixed metal oxide is represented by the following formula (2):

$$Li_a(Ni_{1-(x+y)}Mn_xCo_y)O_2 \qquad (2)$$

wherein, $0.9 \leq a \leq 1.3$, $0.3 \leq x \leq 0.6$, $0.01 \leq y \leq 0.4$, and $0.31 \leq x+y \leq 0.7$.

<11> The method according to <9> or <10>, wherein a temperature of the calcination is within a range of from 650° C. to 950° C.

<12> The method according to any one of <9> to <11>, wherein the inactive flux is potassium sulfate or sodium sulfate or both.

<13> A lithium mixed metal oxide produced by the method according to any one of <1> to <12>.

<14> A lithium mixed metal oxide comprising nickel, cobalt, and manganese, having a BET specific surface area of from 3 m²/g to 15 m²/g, and having an average particle diameter within a range of 0.1 μm or more to less than 1 μm, the diameter determined by a laser diffraction scattering method.

<15> The lithium mixed metal oxide according to <14> having an average primary particle diameter of from 0.05 μm to 0.4 μm.

<16> The lithium mixed metal oxide according to <14> or <15> represented by the following formula (A):

$$Li_a(Ni_{1-(x+y)}Mn_xCo_y)O_2 \quad (A)$$

wherein, $0.9 \leq a \leq 1.3$, $0.3 \leq x \leq 0.6$, $0.01 \leq y \leq 0.4$, and $0.31 \leq x+y \leq 0.7$.

<17> An electrode comprising the lithium mixed metal oxide according to any one of <13> to <16>.

<18> A nonaqueous electrolyte secondary battery comprising the electrode according to <17> as a positive electrode.

<19> The nonaqueous electrolyte secondary battery according to <18> further comprising a separator.

<20> The nonaqueous electrolyte secondary battery according to <19>, wherein the separator is a laminate film which has a heat resistant porous layer and a porous film that contains a thermoplastic resin laminated to each other.

MODE FOR CARRYING OUT THE INVENTION

<First Invention>

A first invention in accordance with the present invention relates to a method of producing a lithium mixed metal oxide, the method including a step of calcining a mixture of one or more compounds of M wherein M is one or more elements selected from the group consisting of nickel, cobalt and manganese, and a lithium compound, in the presence of one or more inactive fluxes selected from the group consisting of a fluoride of A, a chloride of A, a carbonate of A, a sulfate of A, a nitrate of A, a phosphate of A, a hydroxide of A, a molybdate of A and a tungstate of A, wherein A is one or more elements selected from the group consisting of Na, K, Rb, Cs, Ca, Mg, Sr and Ba.

The produced lithium mixed metal oxide preferably has a layered rock salt-type crystal structure from the viewpoint of increasing the discharge capacity of the resultant secondary battery, and is more preferably represented by the following formula (1):

$$Li_aMO_2 \quad (1)$$

wherein M is one or more elements selected from the group consisting of nickel, cobalt and manganese, and $0.9 \leq a \leq 1.3$.

M is one or more elements selected from the group consisting of nickel, cobalt and manganese, and from the viewpoint of increasing the discharge capacity of the resultant secondary battery, M preferably includes nickel. Examples of the combinations of M including nickel include (1) nickel, (2) nickel and cobalt, (3) nickel and manganese, and (4) nickel, cobalt and manganese. Among these, in the case where M includes manganese, that is, when M is (3) nickel and manganese or when M is (4) nickel, cobalt and manganese, another effect for improving the output characteristic of the resultant secondary battery is obtained. When M includes nickel, the molar ratio of nickel to M is preferably from 0.3 to 0.9. The molar ratio of lithium to M is preferably from 0.9 to 1.3.

In the case where M is nickel, cobalt and manganese, that is, in the case where one or more compounds of M include; as a whole, nickel, cobalt and manganese, the lithium mixed metal oxide is preferably represented by the following formula (2):

$$Li_a(Ni_{1-(x+y)}Mn_xCo_y)O_2 \quad (2)$$

wherein $0.9 \leq a \leq 1.3$, $0.3 \leq x \leq 0.6$, $0.01 \leq y \leq 0.4$, $0.31 \leq x+y \leq 0.7$.

In the formula (2), in order to increase the capacity of a nonaqueous electrolyte secondary battery, a is more preferably from 0.95 to 1.15.

In the formula (2), in order to improve the retaining characteristic (hereinafter, may be sometimes referred to as cycling characteristic) of discharge capacity at the time when the charging/discharging of a nonaqueous electrolyte secondary battery are performed repeatedly, x is more preferably from 0.35 to 0.55.

In the formula (2), in order to increase the discharge capacity retaining ratio at a high current rate of a nonaqueous electrolyte secondary battery, y is more preferably from 0.03 to 0.3, and further preferably from 0.05 to 0.2.

In the formula (2), in order to improve the capacity and cycling characteristic of a nonaqueous electrolyte secondary battery, the value of x+y is more preferably from 0.4 to 0.6, and further preferably from 0.45 to 0.55.

Examples of the compound of M include respective compounds of nickel, cobalt, and manganese, including oxides, hydroxides (including oxyhydroxides, the same is true in the following description), chlorides, carbonates, sulfates, nitrates, oxalates, acetates, and the like, and hydroxides are preferably used. One or more kinds of these compounds of M may be mixed. The compound of M is preferably a mixed metal compound containing a plurality of transition metal elements, that is; two or more kinds of elements selected from the group consisting of nickel, cobalt, and manganese. Such a mixed metal compound of M can be obtained by coprecipitation. As the mixed metal compound of M obtained by coprecipitation, mixed metal hydroxides of M are preferably used.

In the present invention, the phrase "one or more compounds of M include, as a whole, nickel, cobalt and manganese" refers to the fact that one or more compounds of M are compounds including nickel, cobalt and manganese, or are comprised of two or more compounds including one or more elements selected from the group consisting of nickel, cobalt and manganese, and these compounds include, as a whole, nickel, cobalt and manganese.

The following description will discuss a method of producing a mixed metal compound containing nickel (hereinafter, may be sometimes referred to as nickel-containing mixed metal compound), which is a preferable aspect of the compound of M. The nickel-containing mixed metal compound is, for example, a coprecipitation product of nickel and one or more elements other than nickel. The coprecipitation product is produced through a coprecipitation method. Specific examples of the coprecipitation method include a method including the following (1) and (2) steps in this order.

(1) A step of obtaining a coprecipitation slurry by bringing an aqueous solution containing nickel and one or more elements other than nickel into contact with a precipitant.

(2) A step of obtaining a coprecipitation product from the coprecipitation slurry.

In the step (1), as the aqueous solution containing nickel and one or more elements other than nickel (hereinafter, may be sometimes referred to as aqueous transition metal solution), in the case where the elements other than nickel represent cobalt or manganese or both, an aqueous solution containing one or more elements selected from the group consisting of nickel, cobalt and manganese may be used. The aqueous transition metal solution can be obtained by dissolving compounds, such as chlorides, nitrates, acetates, formates or oxalates in water. In the case where a raw material for a transition metal element is hardly dissolved in water, that is, in the case where the raw material is, for example, an oxide, a hydroxide, or a metal material, the raw material may be dissolved in an acid, such as hydrochloric acid, sulfuric acid, or nitric acid, or an aqueous solution of these acids, so that an aqueous transition metal solution can be obtained.

In the step (1), as the precipitant, one or more compounds selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate), $(NH_4)_2CO_3$ (ammonium carbonate) and $(NH_2)_2CO$ (urea) may be used, or one or more hydrates of the compounds may be used, or the compounds and the hydrates thereof may be used in combination. The precipitant is preferably dissolved in water, and prepared as a precipitant in an aqueous solution state.

In the step (1), examples of the method for bringing the aqueous transition metal solution and the precipitant into contact with each other include a method in which the precipitant (including precipitant in an aqueous solution state) is added to the aqueous transition metal solution, a method in which the aqueous transition metal solution is added to the precipitant in an aqueous solution state, and a method in which the aqueous transition metal solution and the precipitant (including precipitant in an aqueous solution state) are added to water. Upon adding these materials, stirring is preferably carried out. In the step (1), a coprecipitation slurry can be obtained by the above-mentioned contact.

In the step (2), a precipitation product is obtained from the precipitation product slurry. The step (2) may be carried out using any method as long as a coprecipitation product can be obtained; however, from the viewpoint of operability, a solid-liquid separation method such as filtration is preferably used. By using another method in which the coprecipitation slurry is heated to evaporate the liquid, such as spray drying, a coprecipitation product can be obtained.

In the case of obtaining a coprecipitation product by the solid-liquid separation in the step (2), the step (2) is preferably modified as the following step (2').

(2') a step of obtaining a coprecipitation product by washing and drying the resultant solid component after solid-liquid separation of the coprecipitation slurry.

In the step (2'), in the case where impurities, for example, the precipitant, Cl, and the like are excessively present in the solid component obtained after the solid-liquid separation, these impurities can be removed. In order to efficiently wash the solid component, water is preferably used as a washing solution. A water-soluble organic solvent, such as alcohol or acetone, may be added to the washing solution, if necessary. The washing may be carried out two or more times, and for example, after the water washing is carried out, washing may be again carried using the above-mentioned water-soluble organic solvent.

In the step (2'), after washing, drying is carried out and a coprecipitation product is obtained. The drying is normally carried out by a thermal treatment (heating). Blow drying, vacuum drying, or the like may be carried out. In the case where the coprecipitation product is dried by a heating treatment, the temperature is normally from 50 to 300° C., and preferably from about 100 to 200° C.

The coprecipitation product obtained by the above-mentioned method is a nickel-containing mixed metal compound. When the precipitant is an alkali material or alkali such as ammonia, the nickel-containing mixed metal compound is a nickel-containing mixed metal hydroxide. The nickel-containing mixed metal compound is preferably a nickel-containing mixed metal hydroxide.

Examples of the lithium compound include an oxide, hydroxide, chloride, carbonate, sulfate, nitrate, oxalate, acetate, and the like of lithium. An oxide and hydroxide of lithium tend to easily change into a carbonate in the presence of carbon dioxide in the air, with the result that it may sometimes become difficulty in handling. From the viewpoint of stability in the air, a chloride, carbonate, sulfate or nitrate of lithium is preferably used as the lithium compound, and more preferably lithium carbonate. In general, there is a possibility that a carbonate inhibits a charging/discharging reaction in a nonaqueous electrolyte secondary battery to cause a reduction in discharge capacity; however, in the present invention, even when lithium carbonate is used as the lithium compound, since the mixture is calcined in the presence of a specific inactive flux, the residual amount of the carbonate can be further reduced.

The inactive flux hardly reacts with a mixture when being calcined. Examples of the inactive flux include one or more compounds selected from the group consisting of a fluoride of A, a chloride of A, a carbonate of A, a sulfate of A, a nitrate of A, a phosphate of A, a hydroxide of A, a molybdate of A and a tungstate of A, are proposed. A is one or more elements selected from the group consisting of Na, K, Rb, Cs, Ca, Mg, Sr and Ba.

Examples of the fluoride of A include NaF (melting point: 993° C.), KF (melting point: 858° C.), RbF (melting point: 795° C.), CsF (melting point: 682° C.), $CaF_2$ (melting point: 1402° C.), $MgF_2$ (melting point: 1263° C.), $SrF_2$ (melting point: 1473° C.) and $BaF_2$ (melting point: 1355° C.)

Examples of the chloride of A include NaCl (melting point: 801° C.), KCl (melting point: 770° C.), RbCl (melting point: 718° C.) CsCl (melting point: 645° C.), $CaCl_2$ (melting point: 782° C.), $MgCl_2$ (melting point: 714° C.), $SrCl_2$ (melting point: 857° C.) and $BaCl_2$ (melting point: 963° C.)

Examples of the carbonate of A include $Na_2CO_3$ (melting point: 854° C.) (melting point: 990° C.), $SrCO_3$ (melting point: 1479° C.) and $BaCO_3$ (melting point: 1380° C.).

Examples of the sulfate of A include $Na_2SO_4$ (melting point: 884° C.), $K_2SO_4$ (melting point: 1069° C.), $Rb_2SO_4$ (melting point: 1066° C.), $Cs_2SO_4$ (melting point: 1005° C.), $CaSO_4$ (melting point: 1460° C.), $MgSO_4$ (melting point: 1137° C.), $SrSO_4$ (melting point: 1605° C.) and $BaSO_4$ (melting point: 1580° C.).

Examples of the nitrate of A include $NaNO_3$ (melting point: 310° C.), $KNO_3$ (melting point: 337° C.), $RbNO_3$ (melting point: 316° C.), $CsNO_3$ (melting point: 417° C.), $Ca(NO_3)_2$ (melting point: 561° C.), $Mg(NO_3)_2$, $Sr(NO_3)_2$ (melting point: 645° C.) and $Ba(NO_3)_2$ (melting point: 596° C.).

Examples of the phosphate of A include $Na_3PO_4$, $K_3PO_4$ (melting point: 1340° C.), $Rb_3PO_4$, $Cs_3PO_4$, $Ca_3(PO_4)^2$, $Mg_3(PO_4)_2$ (melting point: 1184° C.), $Sr_3(PO_4)_2$ (melting point: 1727° C.) and $Ba_a(PO_4)_2$ (melting point: 1767° C.)

Examples of the hydroxide of A include NaOH (melting point: 318° C.), KOH (melting point: 360° C.), RbOH (melting point: 301° C.), CsOH (melting point: 272° C.), Ca(OH)$_2$ (melting point: 408° C.), Mg(OH)$_2$ (melting point: 350° C.), Sr(OH)$_2$ (melting point: 375° C.) and Ba(OH)$_2$ (melting point: 853° C.).

Examples of the molybdate of A include Na$_2$MoO$_4$ (melting point: 698° C.), K$_2$MoO$_4$ (melting point: 919° C.), Pb$_2$MoO$_4$ (melting point: 958° C.), Cs$_2$MoO$_4$ (melting point: 956° C.), CaMoO$_4$ (melting point: 1520° C.), MgMoO$_4$ (melting point: 1060° C.), SrMoO$_4$ (melting point: 1040° C.) and BaMoO$_4$ (melting point: 1460° C.).

Examples of the tungstate of A include Na$_2$WO$_4$ (melting point: 687° C.), K$_2$WO$_4$, Pb$_2$WO$_4$, Cs$_2$WO$_4$, CaWO$_4$, MgWO$_4$, SrWO$_4$ and BaWO$_4$.

Two or more kinds of these inactive fluxes may be used. When two or more kinds of these are used, the melting point may sometimes drop. From the viewpoint of obtaining a lithium mixed metal oxide having high crystallinity, the inactive flux is preferably a carbonate of A or a chloride of A or both, and A is preferably Na or K or both. That is, the inactive flux is particularly preferably is one or more compounds selected from the group consisting of NaCl, KCl, Na$_2$CO$_3$ and K$_2$CO$_3$. By using these inactive fluxes, it becomes possible to suppress the generation of an impurity phase of the resultant lithium mixed metal oxide, and also to suppress the generation of crystal distortion of the lithium mixed metal oxide caused by charging/discharging operations. Moreover, by using these inactive fluxes, even in the case where the lithium compound is lithium carbonate, the residual amount of the carbonate in the resultant lithium mixed metal oxide can be further reduced. Finally, the discharge capacity of a nonaqueous electrolyte secondary battery can be further increased, and the cycling characteristic can be further improved.

In the case where M is nickel, cobalt and manganese, that is, when one or more compounds of M include, as a whole, nickel, cobalt and manganese, the inactive flux is preferably potassium sulfate or sodium sulfate or both. By using these inactive fluxes, the particle shape of the resultant lithium mixed metal oxide can be uniformly arranged.

The amount of the inactive flux to be present can be appropriately selected. From the viewpoint of further uniformly arranging the particle diameter of the resultant lithium mixed metal oxide, at the commencement of calcination, the inactive flux is preferably present in an amount of 0.1 parts by weight or more, and more preferably 1 part by weight of more per 100 parts by weight of the lithium compound. In order to increase the reaction activity of the lithium compound and the compound of M, at the commencement of calcination, the inactive flux is preferably present in an amount of 400 parts by weight or less, and more preferably 100 parts by weight or less per 100 parts by weight of the lithium compound. If necessary, an inactive flux other than the above-mentioned inactive fluxes, for example, an ammonium salt such NH$_4$Cl or NH$_4$F may be used in combination.

One or more compounds of M and the lithium compound are mixed to obtain a mixture. Either dry mixing or wet mixing may be used in mixing. From the viewpoint of convenience, dry mixing is preferably used. Examples of a mixing apparatus include a stirring mixer, a V-type mixer, a W-type mixer, a ribbon mixer, a drum mixer, a ball mill, and a Lodige mixer. In the present invention, the inactive flux may be mixed with the above-mentioned mixture, one or more compounds of M and the lithium compound may be mixed together. By calcining the resultant mixture containing the inactive flux, a mixture of one or more compounds of M and the lithium compound can be calcined in the presence of the inactive flux.

The calcining temperature gives influences on the particle diameter of the primary particles, particle diameter of the secondary particles and BET specific surface area of the resultant lithium mixed metal oxide. Normally, as the calcining temperature becomes higher, the particle diameter of the primary particles and the particle diameter of the secondary particles tend to become greater, and the BET specific surface areas thereof tend to become smaller. Although the calcining temperature is different depending on the kind of the transition metal element to be used, the kind of the precipitant and the kind of the inactive flux, the calcining temperature is, in particular, preferably within a range of from the melting point −100° C. to the melting point +100° C., in consideration of the melting point of the above-mentioned inactive flux. More specifically, the calcining temperature is within a range of from 200° C. to 1150° C., preferably from 300° C. to 1150° C., and more preferably from 500° C. to 1000° C.

In the case where M is nickel, cobalt and manganese, that is, when one or more compounds of M include, as a whole, nickel, cobalt and manganese, the calcining temperature is preferably within a range of from 650° C. to 950° C. from the viewpoint of obtaining a uniform lithium mixed oxide.

By carrying out the calcination of the mixture in the presence of the inactive flux, the reaction of the mixture is accelerated. The residue of the inactive flux may either remain in the lithium mixed metal oxide after the calcination, or be removed by carrying out washing with water or the like after the calcination. In the case where no inactive flux is used, normally, no washing is carried out; however, in the present invention, the lithium mixed metal oxide after having been calcined is preferably washed with water or the like.

The period of time during which the calcining temperature is retained at the temperature is normally from 0.1 to 20 hours, and preferably from 0.5 to 10 hours. The temperature rising rate up to the calcining temperature is normally from 50 to 400° C./hour, and the temperature lowering rate from the calcining temperature to room temperature is normally from 10 to 400° C./hour. As the calcining atmosphere, atmospheric air, oxygen, nitrogen, argon or a mixed gas thereof may be used.

The lithium mixed metal oxide obtained after the calcination may be pulverized using a ball mill, a jet mill or the like. The pulverization and the calcination may be repeated two or more times. The lithium mixed metal oxide may be washed or classified, if necessary. This makes it possible to adjust the bulk density of the lithium mixed metal oxide, and the bulk density is preferably from 1.0 to 3.5 g/cm$^3$.

The lithium mixed metal oxide produced by the method of the present invention has a high discharge capacity per unit volume of a nonaqueous electrolyte secondary battery.

A compound other than the lithium mixed metal oxide may be attached to the lithium mixed metal oxide of the present invention. Examples of the compound include compounds containing one or more elements selected from the group consisting of B, Al, Ga, In, Si, Ge, Sn, Mg and transition metal elements, preferably, compounds containing one or more elements selected from the group consisting of B, Al, Mg, Ge, In and Sn, and more preferably compounds of Al. Specific examples of the compound include an oxide, hydroxide, oxyhydroxide, carbonate, nitrate and organic acid salt of the above-mentioned elements, and preferably, an oxide, hydroxide and oxyhydroxide thereof. These compounds may be used in a mixed manner. Among these compounds, alumina is the most preferable compound. After the attachment, heating may be carried out.

<Second Invention>

A second invention in accordance with the present invention relates to a lithium mixed metal oxide containing nickel, cobalt, and manganese, having a BET specific surface area of from 3 m²/g to 15 m²/g, and having an average particle diameter (hereinafter, may be sometimes referred to simply as average particle diameter) within a range of 0.1 μm or more to less than 1 μm, the average particle diameter determined by a laser diffraction scattering method.

The second invention makes it possible to obtain a nonaqueous electrolyte secondary battery that exerts a high discharge capacity retaining rate at a high current rate, in comparison with a conventional lithium secondary battery. The secondary battery is extremely usable for applications in which a high discharge capacity retaining rate at a high current rate is required, that is, usable as a nonaqueous electrolyte secondary battery for automobiles and power tools such as electric tools.

In the case where the lithium mixed metal oxide has a BET specific surface area of less than 3 m²/g or exceeds 15 m²/g, the discharge capacity retaining rate at a high current rate in the resultant nonaqueous electrolyte secondary battery becomes insufficient. In order to increase the discharge capacity retaining rate at a high current rate, the lithium mixed metal oxide preferably has a BET specific surface area of 5 m²/g or more. In order to improve the filling characteristic, it is preferably 10 m²/g or less.

In the case where the lithium mixed metal oxide has an average particle diameter of less than 0.1 μm, the resultant nonaqueous electrolyte secondary battery has an insufficient cycling characteristic. In the case where the lithium mixed metal oxide has an average particle diameter of 1 μm or more, the resultant nonaqueous electrolyte secondary battery has an insufficient discharge capacity retaining rate at a high current rate. In order to obtain a higher cycling characteristic and a higher discharge capacity retaining rate at a high current rate, the lithium mixed metal oxide preferably has an average particle diameter of from 0.2 to 0.8 μm, and more preferably from 0.3 to 0.7 μm.

From the viewpoint of increasing the capacity of the nonaqueous electrolyte secondary battery, the lithium mixed metal oxide preferably has an average primary particle diameter of from 0.05 μm to 0.4 μm, more preferably from 0.07 to 0.35 μm, and further preferably from 0.1 to 0.3 μm.

The lithium mixed metal oxide is preferably represented by the following formula (A):

$$Li_a(N_{1-(x+y)}Mn_xCo_y)O_2 \quad (A)$$

wherein 0.9≤a≤1.3, 0.3≤x≤0.6, 0.01≤y≤0.4, 0.31≤x+y≤0.7.

From the viewpoint of increasing the capacity of the nonaqueous electrolyte secondary battery, a is preferably from 0.95 to 1.15.

From the viewpoint of improving the cycling characteristic of the nonaqueous electrolyte secondary battery, x is preferably from 0.35 to 0.55.

From the viewpoint of further increasing the discharge capacity retaining rate at a high current rate in the nonaqueous electrolyte secondary battery, y is preferably from 0.03 to 0.3, and more preferably from 0.05 to 0.2.

From the viewpoint of further improving the capacity and cycling characteristic of the nonaqueous electrolyte secondary battery, a value of x+y is preferably from 0.4 to 0.6, and more preferably from 0.45 to 0.55.

One portion of Co may be substituted with one or more elements selected from the group consisting of Al, Mg, Ba, Cu, Ca, Zn, V, Ti, Si, W, Mo, Nb and Zr, within a range not impairing the effect for the discharge capacity retaining rate at a high current rate.

The lithium mixed metal oxide of the present invention is comprised of a mixture of primary particles and secondary particles formed by aggregating primary particles. The average particle diameter of each of the primary particles and the secondary particles can be determined by observing the particles with an SEM. The average particle diameter of the lithium mixed metal oxide comprised of the mixture of primary particles and secondary particles formed by aggregating primary particles can be determined by a laser diffraction scattering method.

In order to further enhance the effect for the discharge capacity retaining rate at a high current rate, the lithium mixed metal oxide of the present invention is preferably provided with an α-NaFeO₂-type crystal structure, that is, a crystal structure belonging to the R-3m space group. The crystal structure can be identified from a powder X-ray diffraction pattern obtained by the powder X-ray diffraction measurement of the lithium mixed metal oxide using CuKα as a radiation source.

Within a range not impairing the effect for the discharge capacity retaining rate at a high current rate, a compound different from the lithium mixed metal oxide may be attached to the lithium mixed metal oxide of the present invention. Examples of the compound include compounds containing one or more elements selected from the group consisting of B, Al, Ga, In, Si, Ge, Sn, Mg and transition metal elements, preferably, compounds containing one or more elements selected from the group consisting of B, Al, Mg, Ga, In and Sn, and more preferably compounds of Al. Specific examples of the compound include an oxide, hydroxide, oxyhydroxide, carbonate, nitrate and organic acid salt of the above-mentioned elements, and preferably, an oxide, hydroxide and oxyhydroxide thereof. These compounds may be used in a mixed manner. Among these compounds, alumina is the most preferable compound. After the attachment, heating may be carried out.

Next, the following description will discuss a method of producing a lithium mixed metal oxide in accordance with the second invention. The lithium mixed metal oxide of the second invention can be produced by the above-mentioned first invention. The lithium mixed metal oxide of the second invention may be produced by the following method. For example, by calcining a lithium mixed metal oxide material containing nickel, cobalt and manganese at prescribed molar ratios, the lithium mixed metal oxide of the second invention can be produced. The lithium mixed metal oxide raw material is a mixture of a lithium compound and a transition metal compound raw material containing nickel, cobalt and manganese. Examples of the transition metal compound raw material of nickel, cobalt and manganese include mixtures of respective metal compounds of nickel, cobalt and manganese. Examples of the metal compound include respective oxides, hydroxides (hydroxides include oxyhydroxides, and the same is true in the following description), chlorides, carbonates, sulfates, nitrates, oxalates, acetates and the like of nickel, cobalt and manganese, and hydroxides are preferably used. The metal compound may be a compound containing two or more elements of nickel, cobalt and manganese. The compound containing two or more elements of nickel, cobalt and manganese can be obtained by coprecipitation, and is preferably a hydroxide containing two or more elements selected from the group consisting of nickel, cobalt and manganese. The transition metal compound raw material is more preferably a hydroxide containing nickel, cobalt and manganese. Examples of the lithium compound include one or more compounds selected from the group consisting of lithium hydroxide, lithium chloride, lithium nitrate and lithium carbonate. These compounds of lithium may be either anhydrides or hydrates. Among these compounds of lithium, lithium hydroxides or lithium carbonates or both are preferably used. A method of mixing the lithium compound and the transition metal compound raw material containing nickel, cobalt and manganese may be either dry mixing or wet mixing, and from the viewpoint of convenience, dry mixing is preferably used. Examples of a mixing apparatus include a stirring mixer, a V-type mixer, a W-type mixer, a ribbon mixer, a drum mixer, and a ball mill.

Next, the lithium mixed metal oxide raw material is calcined. Prior to calcining, the raw material may be mixed with a second inactive flux, if necessary. The second inactive flux is preferably prepared as a material that hardly react with the lithium mixed metal oxide raw material at the time of the calcination. Preferable examples of the second inactive flux include chlorides such as NaCl, KCl and $NH_4Cl$, carbonates such as $K_2CO_3$ and $Na_2CO_3$, sulfates such as $K_2SO_4$ and $Na_2SO_4$, fluorides such as NaF, KF and $NH_4F$, and borates, and chlorides, carbonates and sulfates are more preferably used. By calcining a mixture of the raw material and the inactive flux, the reactivity of the raw material may be controlled so that the average particle diameter and BET specific surface area of the resultant lithium mixed metal oxide may be adjusted in some cases. Two or more kinds of the second inactive fluxes may be used in combination. The second inactive flux may be remained in the lithium mixed metal oxide after the calcination, or may be removed therefrom by washing the lithium mixed metal oxide after the calcination or by evaporation or the like of the second inactive flux.

The calcining temperature gives influences on the average particle diameter and BET specific surface area of the resultant lithium mixed metal oxide. Normally, as the calcining temperature becomes higher, the average particle diameter tends to become larger and the BET specific surface area tends to become smaller. As the calcining temperature becomes lower, the average particle diameter tends to become smaller and the BET specific surface area tends to become larger. The calcining temperature is preferably from 650° C. to 950° C. The period of time during which the calcining temperature is retained at the temperature is normally from 0.1 to 20 hours, and preferably from 0.5 to 8 hours. The temperature rising rate up to the calcining temperature is normally from 50 to 400° C./hour, and the temperature lowering rate from the calcining temperature to room temperature is normally from 10 to 400° C./hour. Examples of the calcining atmosphere include atmospheric air, oxygen, nitrogen, argon and a mixed gas thereof, and atmospheric air is preferably used.

The resultant lithium mixed metal oxide after the calcination may be pulverized using a ball mill, a jet mill, or the like. The BET specific surface area of the lithium mixed metal oxide may be adjusted in some cases due to the pulverization. The pulverization and the calcination may be repeated two or more times, respectively. The lithium mixed metal oxide may be washed or classified, if necessary.

<Electrode having Lithium Mixed Metal Oxide; Positive Electrode>

An electrode can be obtained using the lithium mixed metal oxide in the following manner. The electrode is produced by supporting an electrode mixture including the lithium mixed metal oxide, a conductive material and a binder onto an electrode collector. Examples of the conductive material include carbonaceous materials. Examples of the carbonaceous material include a graphite powder, carbon black (e.g., acetylene black) and a fiber-state carbonaceous material. Carbon black (e.g., acetylene black) is in the form of fine particles with a large surface area. When a small amount of carbon black is added to the electrode mixture, the conductivity inside the electrode becomes higher so that the charging/discharging efficiency and rate characteristics of a secondary battery are improved. However, in the case where too much of carbon black is added to the electrode mixture, the bonding property of the binder, which is exerted between the electrode mixture and the electrode collector, is lowered, resulting in an increase in resistance inside the electrode. The ratio of the conductive material in the electrode mixture is normally from 5 parts by weight to 20 parts by weight per 100 parts by weight of the lithium mixed metal oxide. When the conductive material is a fiber-state carbonaceous material such as a graphitized carbon fiber or a carbon nanotube, this ratio can be lowered.

Examples of the binder include thermoplastic resins, and specific examples of the thermoplastic resin include fluorine resins such as polyvinylidene fluoride (hereinafter, may be sometimes referred to as PVdF), polytetrafluoroethylene (hereinafter, may be sometimes referred to as PTFE), tetrafluoroethylene-hexafluoropropylene-vinylidene fluoride copolymers, hexafluoropropylene-vinylidene fluoride copolymers, and tetrafluoroethylene-perfluorovinyl ether copolymers; and polyolefin resins such as polyethylene and polypropylene. Two or more kinds of these may be mixed with one another and used. A fluorine resin and a polyolefin resin may be used as the binder, and by allowing the electrode mixture to contain these resins so as to have a ratio of the fluorine resin from 1 to 10% by weight as well as a ratio of the polyolefin resin from 0.1 to 2% by weight relative to the electrode mixture, an electrode mixture having a superior bonding property with the electrode collector can be obtained.

Examples of the electrode collector include Al, Ni, and stainless steel, and Al is preferably used from the viewpoints of being easily processed into a thin film and of low costs. Examples of a method of supporting the electrode mixture on the electrode collector include a pressure molding method and a method in which an electrode mixture paste is obtained further using an organic solvent or the like, and then the paste is applied to the electrode collector, followed by drying, and the resultant sheet is pressed so that the electrode mixture is anchored to the collector. The paste contains the lithium mixed metal oxide, the conductive material, the binder and an organic solvent. Examples of the organic solvent include amine-based solvents such as N,N-dimethylaminopropylamine and diethylenetriamine, ether-based solvents such as tetrahydrofuran, ketone-based solvents such as methylethyl ketone, ester-based solvents such as methyl acetate, and amide-based solvents such as dimethyl acetoamide and N-methyl-2-pyrrolidone (hereinafter, may be sometimes referred to as NMP).

Examples of a method of applying the electrode mixture paste onto the electrode collector include a slit-die coating method, a screen coating method, a curtain coating method, a knife coating method, a gravure coating method, and an electrostatic spraying method. As such, an electrode can be produced.

<Nonaqueous Electrolyte Secondary Battery>

The electrode of the present invention is effectively usable as a positive electrode for a nonaqueous electrolyte secondary battery. In a nonaqueous electrolyte secondary battery having a positive electrode, a negative electrode and an electrolyte, the electrode of the present invention is used as the positive electrode. For example, the nonaqueous electrolyte secondary battery is produced in the following manner. The nonaqueous electrolyte secondary battery, for example a lithium secondary battery, can be produced through processes in which an electrode group obtained by stacking or stacking and winding a separator, a negative electrode, a separator and a positive electrode, is housed in a battery case such as a battery can, and an electrolytic solution is injected into the case.

Examples of the shape of the electrode group include shapes having a cross section such as a circular shape, an elliptical shape, a rectangular shape or a rectangular shape with round corners, when the electrode group was cut in the direction perpendicular to the axis of winding of the electrode group. Examples of the shape of the battery include a paper shape, a coin shape, a cylinder shape, and a rectangular shape.

<Negative Electrode for Nonaqueous Electrolyte Secondary Battery>

The negative electrode can be doped and dedoped with the lithium ions at a potential lower than that of the positive electrode. Examples of the negative electrode include an electrode formed by supporting a negative electrode mixture containing a negative electrode material on a negative electrode collector, or an electrode comprised of solely a negative electrode material. Examples of the negative electrode material include materials such as a carbonaceous material, a chalcogen compound such as an oxide or a sulfide, a nitride, metal and an alloy, which can be doped and dedoped with lithium ions at a potential lower than that of the positive electrode. These negative electrode materials may be mixed and used.

The negative electrode material is exemplified in the following materials. Specific examples of the carbonaceous material include graphites such as natural graphite and artificial graphite, cokes, carbon black, thermally decomposable carbons, carbon fibers, and calcined polymeric materials. Specific examples of the oxide include oxides of silicon represented by the formula $SiO_x$ (wherein x is a positive real number) such as $SiO_2$ and SiO; oxides of titanium represented by the formula $TiO_x$ (wherein x is a positive real number) such as $TiO_2$ and TiO; oxides of vanadium represented by the formula $VO_x$ (wherein x is a positive real number) such as $V_2O_5$ and $VO_2$; oxides of iron represented by the formula $FeO_x$ (wherein x is a positive real number) such as $Fe_3O_4$, $Fe_2O_3$ and FeO; oxides of tin represented by the formula $SnO_x$ (wherein x is a positive real number) such as $SnO_2$ and SnO; oxides of tungsten represented by the general formula $WO_x$ (wherein x is a positive real number) such as $WO_3$ and $WO_2$; and mixed metal oxides containing lithium and titanium and/or vanadium such as $Li_4Ti_5O_{12}$ and $LiVO_2$ (including $Li_{1.1}V_{0.9}O_2$). Specific examples of the sulfide include sulfides of titanium represented by the formula $TiS_x$ (wherein x is a positive real number) such as $Ti_2S_3$, $TiS_2$ and TiS; sulfides of vanadium represented by the formula $VS_x$ (wherein x is a positive real number) such as $V_3S_4$, $VS_2$ and VS; sulfides of iron represented by the formula $FeS_x$ (wherein x is a positive real number) such as $Fe_3S_4$, $FeS_2$ and FeS; sulfides of molybdenum represented by the formula $MoS_x$ (wherein x is a positive real number) such as $Mo_2S_3$ and $MoS_2$; sulfides of tin represented by the formula $SnS_x$ (wherein x is a positive real number) such as $SnS_2$ and SnS; sulfides of tungsten represented by the formula $WS_x$ (wherein x is a positive real number) such as $WS_2$; sulfides of antimony represented by the formula $SbS_x$ (wherein x is a positive real number) such as $Sb_2S_3$; and sulfides of selenium represented by the formula $SeS_x$ (wherein x is a positive real number) such as $Se_5S_3$, $SeS_2$ and SeS. Specific examples of the nitride include lithium-containing nitrides such as $Li_3N$ and $Li_{3-x}A_xN$ (wherein A represents Ni and/or Co, and $0 \leq x \leq 3$ is satisfied). Two or more kinds of these carbonaceous materials, oxides, sulfides and nitrides may be used in combination. These materials may be crystalline or amorphous. Each of these carbonaceous materials, oxides, sulfides and nitrides is mainly supported on a negative electrode collector, and used as an electrode.

Specific examples of the metal include lithium metal, silicon metal and tin metal. Specific examples of the alloy include lithium alloys such as Li—Al, Li—Ni and Li—Si; silicon alloys such as Si—Zn; tin alloys such as Sn—Mn, Sn—Co, Sn—Ni, Sn—Cu and Sn—La; and alloys such as $Cu_2Sb$ and $La_3Ni_2Sn_7$. Each of these metals and alloys is mainly used alone as an electrode (for example, as a foil).

From the viewpoints of high potential flatness, low average discharging potential and good cycling characteristics of the resultant secondary battery, the negative electrode material is preferably a carbonaceous material mainly composed of graphite such as natural graphite or artificial graphite. Examples of the shape of the carbonaceous material include a flaky shape such as natural graphite, a spherical shape such as meso-carbon microbeads, a fiber shape such as graphitized carbon fibers, and an aggregate of fine powders.

The negative electrode mixture may contain a binder, if necessary. Examples of the binder include thermoplastic resins. Specific examples of the thermoplastic resin include PVdF, thermoplastic polyimide, carboxymethyl cellulose, polyethylene, and polypropylene.

Examples of the negative electrode collector include Cu, Ni, and stainless steel, and from the viewpoints of hardly forming an alloy with lithium and of being easily processed into a thin film, Cu is preferably used. Examples of a method of supporting the negative electrode mixture onto the negative electrode collector include the same methods as those of the positive electrode, that is, a pressure molding method and a method in which a negative electrode mixture paste is obtained by further using a solvent or the like, and then the paste is applied to the negative electrode collector, followed by drying, and the resultant sheet is pressed so that the negative electrode mixture is anchored to the collector.

<Separator for Nonaqueous Electrolyte Secondary Battery>

Examples of the separator include members having various material modes such as a porous film, a nonwoven cloth, and a woven cloth, which are made from materials such as polyolefin resins including polyethylene and polypropylene, fluorine resins, and nitrogen-containing aromatic copolymers. The separator may be made from two or more kinds of the above-mentioned materials, or may be a laminated separator which has the above-mentioned members laminated to each other. Examples of the separator include those separators disclosed in, for example, JP2000-30686A and JP10-324758A. From the viewpoint of increasing the volume energy of the battery with a reduction in inner resistance, the thickness of the separator is normally from about 5 to 200 μm, and preferably from about 5 to 40 μm. The separator is preferably made as thin as possible, as long as its mechanical strength can be retained.

The separator preferably includes a porous film containing a thermoplastic resin. In a nonaqueous electrolyte secondary battery, the separator is disposed between the positive electrode and the negative electrode. The separator preferably has such a function that, when an abnormal current flows in a battery due to a short circuit or the like between positive and negative electrodes, it interrupts the current to prevent an excessive current from flowing therethrough (shutdown). In this case, the shutdown is carried out by clogging the fine pores of the porous film in the separator when the normally used temperature is exceeded. Even when, after the shutdown, the temperature inside the battery rises to a certain degree of high temperature, the shutdown state is preferably retained without being film-ruptured by the temperature. Examples of such a separator include laminate films which have a heat resistant porous layer and a porous film laminated to each other. By using the film as the separator, the heat resistant property of the secondary battery is further improved. The heat resistant porous layers may be laminated to the two surfaces of the porous film.

<Separator for Nonaqueous Electrolyte Secondary Battery: Laminate Film>

The following description will discuss the laminate film which has the heat resistant porous layer and the porous film laminated to each other. In the laminate film, the heat resistant porous layer is a layer having a heat resistant property higher than that of the porous film, and the heat resistant porous layer may be formed from an inorganic powder, or may contain a heat resistant resin. By allowing the heat resistant porous layer to contain a heat resistant resin, it is possible to form a heat resistant porous layer using an easy procedure such as coating. Examples of the heat resistant resin include polyamide, polyimide, polyamideimide, polycarbonate, polyacetal, polysulfone, polyphenylene sulfide, polyetherketone, aromatic polyester, polyether sulfone and polyether imide, and from the viewpoint of further improving the heat resistant property, preferably polyamide, polyimide, polyamideimide, polyether sulfone and polyether imide, more preferably, polyamide, polyimide and polyamideimide, furthermore preferably, nitrogen-containing aromatic polymers such as aromatic polyamides (para-oriented aromatic polyamides, meta-oriented aromatic polyamides), aromatic polyimides, and aromatic polyamideimides, and still furthermore preferably, aromatic polyamides, and from the viewpoint of production, particularly preferably para-oriented aromatic polyamides (hereinafter, may be sometimes referred to as para-aramide). Moreover, examples of the heat resistant resin include poly-4-methylpentene-1 and cyclic olefin-based polymers. By using these heat resistant resins, the heat resistant property of the laminate film, that is, the thermal film-rupturing temperature of the laminate film can be improved. In the case where, among these heat resistant resins, the nitrogen-containing aromatic polymer is used, good compatibility with an electrolytic solution may be sometimes exerted because of the polarity inside its molecule, and in such a case, the liquid-retaining property of the electrolytic solution in the heat resistant porous layer is improved. Thus, upon production of a nonaqueous electrolyte secondary battery, the injecting rate of the electrolytic solution becomes faster, and the charge/discharge capacity of the nonaqueous electrolyte secondary battery is also increased.

The thermal film-rupturing temperature of the laminate film depends on the kind of the heat resistant resin, and is selected and used in accordance with the application state and application purpose. More specifically, in the case where the nitrogen-containing aromatic polymer is used as the heat resistant resin, the thermal film-rupturing temperature can be controlled to about 400° C., in the case where poly-4-methylpentene-1 is used, it can be controlled to about 250° C., and in the case where a cyclic olefin-based polymer is used, it can be controlled to about 300° C., respectively. In the case where the heat resistant porous layer is made from an inorganic powder, the thermal film-rupturing temperature can be controlled to, for example, 500° C. or more.

The para-amide can be obtained by condensation polymerization between a para-oriented aromatic diamine and a para-oriented aromatic dicarboxylic acid halide, and its amide bonds are virtually composed of repeating units bonded at the para position or corresponding oriented position of an aromatic ring (for example, an oriented position extending coaxially in the opposite direction or in parallel therewith, such as 4,4'-biphenylene, 1,5-naphthalene, and 2,6-naphthalene). Specific examples thereof include para-aramides having a para-oriented structure or a structure corresponding to the para-oriented type such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6 naphthalene dicarboxylic acid amide), poly(2-chloroparaphenylene terephthalamide), and paraphenylene terephthalamide/2,6-dichloroparaphenylene terephthalamide copolymers.

The aromatic polyimide is preferably a total aromatic polyimide produced by condensation polymerization between an aromatic dianhydride and a diamine. Specific examples of the dianhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl)hexafluoropropane and 3,3',4,4'-biphenyltetracarboxylic dianhydride. Specific examples of the diamine include oxydianiline, paraphenylene diamine, benzophenone diamine, 3,3'-methylene dianiline, 3,3'-diaminobenzophenone, 3,3'-diaminodiphenyl sulfone and 1,5-naphthalene diamine. Moreover, a polyimide that is soluble to a solvent is desirably used. Examples of the polyimide include a polyimide of a polycondensation product between 3,3',4,4'-diphenylsulfonetetracarboxylic dianhydride and an aromatic diamine.

Examples of the aromatic polyamideimide include a condensation polymerization product between an aromatic dicarboxylic acid and an aromatic diisocyanate, and a condensation polymerization product between an aromatic dianhydride and an aromatic diisocyanate. Specific examples of the aromatic dicarboxylic acid include isophthalic acid and terephthalic acid. Specific examples of the aromatic dianhydride include trimellitic anhydride. Specific examples of the aromatic diisocyanate include 4,4'-diphenylmethane diisocyanate, 2,4-tolylene diisocyanate, 2,6-tolylene diisocyanate, ortho-tolylene diisocyanate, and m-xylene diisocyanate.

From the viewpoint of improving the ion permeability, the thickness of the heat resistant porous layer is preferably made thinner, and specifically, it is preferably from 1 μm to 10 μm, more preferably from 1 μm to 5 μm, and particularly preferably from 1 μm to 4 μm. The heat resistant porous layer has fine pores, and the size (diameter) of each pore is normally 3 μm or less, and preferably 1 μm or less. In the case where the heat resistant porous layer contains a heat resistant resin, the heat resistant porous layer may contain a filler, which will be described later.

The porous film in the laminate film has fine pores. The porous film is preferably provided with a shutdown function, and in this case, it contains a thermoplastic resin. The size (diameter) of each fine pore of the porous film is normally 3 μm or less, and preferably 1 μm or less. The rate of porosity of the porous film is normally from 30 to 80% by volume, and preferably from 40 to 70% by volume. In the case where a nonaqueous electrolyte secondary battery is used at a temperature exceeding a normally used temperature, the porous film is allowed to clog the fine pores by softening the thermoplastic resin forming the film.

As the thermoplastic resin, a resin that is not dissolved in an electrolytic solution in the nonaqueous electrolyte secondary battery is selected. Specific examples of the thermoplastic resin include polyolefin resins such as polyethylene and polypropylene, and a thermoplastic polyurethane resin, and two or more kinds of the thermoplastic resins may be mixed and used. From the viewpoint of being softened at a lower temperature to shutdown, the porous film preferably contains a polyethylene. Specific examples of the polyethylene include a low-density polyethylene, a high-density polyethylene and a linear polyethylene, and an ultra-high molecular weight polyethylene having a molecular weight of 1,000,000 or more. From the viewpoint of further increasing the sticking-resistant strength of the porous film, the porous film preferably contains an ultra-high molecular weight polyethylene. In order to easily produce the porous film, the thermoplastic resin may be preferably allowed to contain a wax made from polyolefin having a low molecular weight (weight average molecular weight of 10,000 or less) in some cases.

The thickness of the porous film in the laminate film is normally from 3 to 30 μm, preferably from 3 to 25 μm, and more preferably from 3 to 19 μm. The thickness of the laminate film is normally 40 μm or less, preferably 30 μm or less, and more preferably 20 μm or less. Assuming that the thickness of the heat resistant porous layer is A (μm), and that the thickness of the porous film is B (μm), the value of A/B is preferably from 0.1 to 1.

In the case where the heat resistant porous layer contains a heat resistant resin, the heat resistant porous layer may contain one or more kinds of fillers. The material for the filler may be one or more kinds of materials selected from an organic powder, an inorganic powder and a mixture thereof. Particles forming the filler preferably have an average particle diameter of from 0.01 μm to 1 μm.

Examples of the organic powder include powders made from organic substances such as a single material or a copolymer of two or more kinds of materials including styrene, vinyl ketone, acrylonitrile, methylmethacrylate, ethylmethacrylate, glycidyl methacrylate, glycidyl acrylate and methylacrylate; fluorine resins such as polytetrafluoroethylene, a tetrafluoroethylene-hexafluoropropylene copolymer, a tetrafluoroethylene-ethylene copolymer, and polyvinylidene fluoride; melamine resins; urea resins; polyolefins; and polymethacrylates. Each of these organic powders may be used solely, or two or more kinds thereof may be mixed and used. Among these organic powders, from the viewpoint of chemical stability, a polytetrafluoroethylene powder is preferably used.

Examples of the inorganic powder include powders made from inorganic substances such as metal oxides, metal nitrides, metal carbides, metal hydroxides, carbonates, and sulfates. Among these, powders made from inorganic substances having low conductivity are preferably used. Specific examples of the preferable inorganic powder include powders made from alumina, silica, titanium dioxide, and calcium carbonate. Each of these inorganic powders may be used solely, or two or more kinds thereof may be mixed and used. Among these inorganic powders, from the viewpoint of chemical stability, an alumina powder is preferably used. More preferably, all the particles forming the alumina powder are composed of alumina particles, and furthermore preferably, all the particles forming the filler are alumina particles, with a portion or all of the alumina particles being formed into virtually spherical shapes. In the case where the heat resistant porous layer is made from inorganic powder, the above-mentioned inorganic powder may be used, and may also be mixed with a binder, if necessary, and used.

In the case where the heat resistant porous layer contains a heat resistant resin, the content of the filler is dependent on the specific gravity of the filler material. For example, when all the particles forming the filler are made of alumina particles, the content of the filler is normally from 5 to 95, preferably from 20 to 95, and more preferably from 30 to 90 per total weight 100 of the heat-resistant porous layer. These ranges can be appropriately determined depending on the specific gravity of the filler material.

Examples of the filler shape include a virtually spherical shape, a plate shape, a pillar shape, a needle shape, a whisker shape, and a fiber shape, and from the viewpoint of easily forming uniform pores, a virtually spherical shape is preferable. Examples of the virtually spherical particles include particles having an aspect ratio (major axis of particles/minor axis of particles) of particles of from 1 to 1.5. The aspect ratio of the particles can be measured using an electron microscope photograph.

From the viewpoint of the ion permeability of a secondary battery, the separator is preferably provided with a gas permeability measured by a Gurley method of from 50 to 300 seconds/100 ccs, and more preferably from 50 to 200 seconds/100 ccs. The rate of porosity of the separator is normally from 30 to 80% by volume, and more preferably from 40 to 70% by volume. The separator may be formed by stacking separators having different porosities.

<Electrolytic Solution or Solid-State Electrolyte of Non-aqueous Electrolyte Secondary Battery>

An electrolytic solution normally contains an electrolyte and an organic solvent. Examples of the electrolyte include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$ $Li(F_9SO_3)$, $LiC(SO_2CF_3)_3$, $Li_2B_{10}Cl_{10}$, LiBOB (in this case, BOB represents bis(oxalato)borate), lithium salt of lower aliphatic carboxylic acid, and $LiAlCl_4$, and two or more kinds of the electrolytes may be mixed and used. Normally, among these, one or more kinds of fluorine-containing lithium salts selected from the group consisting of $LiPF_6$, $LiAsF_6$, $LiSbF_6$, $LiCF_3SO_3$, $LiN(SO_2CF_3)_2$ and $LiC(SO_2CF_3)_3$ are used.

In the electrolytic solution, examples of the organic solvent include carbonates such as propylene carbonate, ethylene carbonate (hereinafter, sometimes referred to as EC), dimethyl carbonate (hereinafter, sometimes referred to as DMC), diethyl carbonate, ethylmethyl carbonate (hereinafter, sometimes referred to as EMC), 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methylether, tetrafluoropropyl difluoromethylether, tetrahydrofuran and 2-methyl tetrahydrofuran; esters such as methyl formate, methyl acetate and γ-butyrolactone; nitriles such as acetonitrile and butyronitrile; amides such as N,N-dimethylformamide and N,N-dimethylacetoamide; carbamates such as 3-methyl-2-oxazolidone; sulfur-containing compounds such as sulforan, dimethylsulfoxide and 1,3-propane sultone; and those solvents formed by further introducing a fluorine substituent to the above-mentioned organic solvents. Normally, a mixed solvent obtained by mixing two or more kinds of organic solvents among these solvents is used. Among these, a mixed solvent containing carbonates is preferably used, and a mixed solvent of a cyclic carbonate and an acyclic carbonate, or a mixed solvent of a cyclic carbonate and ethers is more preferably used. As the mixed solvent of a cyclic carbonate and an acyclic carbonate, a mixed solvent containing EC, DMC and EMC is preferable from the viewpoints of providing a wide operating temperature range, a superior load characteristic and a hardly-decomposing property even in the case of using a graphite material such as natural graphite or artificial graphite as a negative electrode active material. In particular, from the viewpoint of obtaining an excellent safety improving effect, an electrolytic solution containing an organic solvent having a fluorine-containing lithium salt such as $LiPF_6$, and a fluorine substituent is preferably used. A mixed solvent containing ethers having a fluorine substituent such as pentafluoropropyl methyl ether and 2,2,3,3-tetrafluoropropyl difluoromethyl ether and DMC is excellent in a large-current discharging characteristic, and it is more preferably used.

In place of the electrolytic solution, a solid-state electrolyte may be used. As the solid-state electrolyte, for example, an organic polymer electrolyte such as a polyethylene oxide-based polymer or a polymer containing at least one kind of a polyorgano siloxane chain and a polyoxyalkylene chain may be used. A so-called gel-type electrolyte formed by allowing a polymer to support an electrolytic solution may also be used. An inorganic solid-state electrolyte containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$ or $Li_2S$—$SiS_2$—$Li_2SO_4$ may be used. By using these solid-state electrolytes, higher safety may be further ensured in some cases. In the nonaqueous electrolyte secondary battery of the present invention, in the case of using a solid-state electrolyte, the solid-state electrolyte may serve as a separator in some cases, and in this case, no separator may be required in some cases.

EXAMPLES

The following description will further discuss the present invention in detail by means of examples. The evaluation method of a lithium mixed metal oxide and the manufacture and evaluation method of an electrode and nonaqueous electrolyte secondary battery are described as follows.

(1-1) Powder X-Ray Diffraction Measurements of Lithium Mixed Metal Oxide

Powder X-ray diffraction measurements were carried out on a lithium mixed metal oxide using RINT 2500 TTR manufactured by Rigaku Corporation. A lithium mixed metal oxide was filled in an exclusively-used substrate. The lithium mixed metal oxide was irradiated with a CuKα ray. Measurement was carried out within a diffraction angle 2θ of from 10 to 90° so that an X-ray diffraction pattern was obtained.

(1-2) Composition Analysis of Lithium Mixed Metal Oxide

After dissolving the lithium mixed metal oxide in hydrochloric acid, by using the resultant aqueous solution, the composition of the lithium mixed metal oxide was determined through an inductively coupled plasma atomic emission spectrophotometry (hereinafter, may be sometimes referred to as ICP-AES, SPS3000 manufactured by SII Nano Technology Inc.).

(1-3) Measurements of BET Specific Surface Area of Lithium Mixed Metal Oxide

After drying 1 g of the lithium mixed metal oxide (powder) in a nitrogen atmosphere at 150° C. for 15 minutes, the BET specific surface area of the lithium mixed metal oxide was measured using Flowsorb II2300 manufactured by Micrometrics Instruments Corporation.

(1-4) Measurements of Average Particle Diameter of Lithium Mixed Metal Oxide

The average particle diameter of the lithium mixed metal oxide was determined by a laser diffraction scattering method. To 50 ml of a 0.2 wt % aqueous sodium hexamethaphosphate solution was loaded 0.1 g of lithium mixed metal oxide (powder), and a dispersion solution with the powder dispersed therein was used as a measuring sample. By using the measuring sample, the particle size distribution of the powder was measured by the use of Mastersizer 2000 (a laser diffraction scattering particle size distribution measuring apparatus) manufactured by Malvern Instruments Ltd., and an accumulated particle size distribution curve on a volume basis was obtained. The average particle diameter of the lithium mixed metal oxide corresponds to a particle diameter ($D_{50}$) at 50% accumulation measured from the finer particle side of the curve.

(1-5) Measurements of Average Primary Particle Diameter of Lithium Mixed Metal Oxide On a conductive sheet pasted onto a sample stage, a lithium mixed metal oxide was mounted, and by using JSM-5510 manufactured by JEOL Ltd., an electron beam with an accelerating voltage of 20 kV was applied thereto so that an SEM observation was carried out on primary particles forming the lithium mixed metal oxide. Arbitrary 50 primary particles were extracted from images (SEM images) obtained by the SEM observations, and the respective particle diameters were measured so that the average primary particle diameter was determined by calculating the average value thereof.

(2-1) Manufacture Method of Electrode 1

A material, obtained by mixing acetylene black and graphite at a ratio of 1:9 (weight ratio), was used as a conductive material. A solution, obtained by dissolving PVdF (PolyVinylideneDiFluoride, manufactured by Kureha Corporation) in NMP (manufactured by Tokyo Chemical Industry Co., Ltd.), was used as a binder solution. A lithium mixed metal oxide and the conductive agent were mixed and then the binder solution was added thereto so as to have the composition of lithium mixed metal oxide:conductive agent:binder=87:10:3 (weight ratio), and these were kneaded so that an electrode mixture paste was obtained. The paste was applied to an Al foil having a thickness of 40 μm serving as a collector, and this was dried at 60° C. for 2 hours so that an electrode sheet was obtained. Next, the electrode sheet was rolled at a pressure of 0.5 MPa using a press roller, and this was punched out by a punching machine into a size of 14.5 mmφ, and then vacuum-dried at 150° C. for 8 hours so that electrodes were obtained.

(2-2) Manufacture Method of Electrode 2

A material, obtained by mixing acetylene black and graphite at a ratio of 9:1 (weight ratio), was used as a conductive material. A solution, obtained by dissolving PVdF (PolyVinylideneDiFluoride, manufactured by Kureha Corporation) in NMP (manufactured by Tokyo Chemical Industry Co., Ltd.), was used as a binder solution. A lithium mixed metal oxide and the conductive agent were mixed and then the binder solution was added thereto so as to have the composition of lithium mixed metal oxide:conductive agent:binder=87:10:3 (weight ratio), and these were kneaded so that an electrode mixture paste was obtained. The paste was applied to an Al foil having a thickness of 40 μm serving as a collector, and this was dried at 60° C. for 2 hours so that an electrode sheet was obtained. Next, the electrode sheet was rolled at a pressure of 0.5 MPa using a press roller, and this was punched out by a punching machine into a size of 14.5 mmφ, and then vacuum-dried at 150° C. for 8 hours so that electrodes were obtained.

(3) Manufacture of Nonaqueous Electrolyte Secondary Battery

The electrode obtained in (2-1) or (2-2) was used as a positive electrode. As a separator, a laminate film (thickness: 16 μm) which had a polyethylene porous film and a heat resistant porous layer laminated thereon to be described later was used. As a solvent for an electrolytic solution, a mixed solvent having a volume ratio of EC:DMC:EMC=30:35:35 was used. As an electrolyte, $LiPF_6$ was used. The electrolyte was dissolved in the mixed solvent at a rate of 1 mole/liter so that an electrolytic solution 1 was prepared. Metal lithium was used as a negative electrode. The positive electrode was placed on the lower lid of a coin cell (manufactured by Hohsen Corporation) with its aluminum foil surface facing down, and the separator was placed thereon, and then the electrolytic solution 1 (300 μl) was injected thereto. Next, the negative electrode is put on the upper side of the separator, and the upper lid of the coin cell was placed thereon with a gasket interpolated therebetween, and the lid was caulked by using a caulking machine, so that a nonaqueous electrolyte secondary battery (coin-shaped battery R2032) was manufactured. The assembling processes of the battery were carried out in a glove box having an argon atmosphere.

(4) Evaluation of Nonaqueous Electrolyte Secondary Battery

By using the nonaqueous electrolyte secondary battery obtained in (3), cycling tests and discharging rate tests were carried out under the following conditions.

<Cycling Tests>
Test temperature: 25° C.
Charging maximum voltage: 4.3 V
Charging time: 8 hours
Charging current: 0.5 $mA/cm^2$
Discharging minimum voltage: 3.0 V
Constant current discharging, discharging current: 0.5 $mA/cm^2$
Number of cycles: 50 times <Charging Rate Test 1>
Test temperature: 25° C.
Charging maximum voltage; 4.3 V
Charging time: 8 hours
Charging current: 0.3 $mA/cm^2$ At the time of discharging, with the discharging minimum voltage being set to a constant value of 2.5 V, the discharging was carried out while the discharging current was changed in the following manner. In this case, as the discharge capacity at 5 C (high current rate) becomes higher, it means that a higher discharge capacity retaining rate at a high current rate is obtained.

Discharging at $1^{st}$ cycle (0.2 C): Charging current 0.3 $mA/cm^2$
Discharging at $2^{nd}$ cycle (5 C): 7.5 $mA/cm^2$ <Charging Rate Test 2>
Test temperature: 25° C.
Charging maximum voltage: 4.3 V
Charging time: 8 hours
Charging current: 0.3 $mA/cm^2$ At the time of discharging, with the discharging minimum voltage being set to a constant value of 2.5 V, the discharging was carried out while the discharging current was changed in the following manner. In this case, as the discharge capacity at 10 C (high current rate) becomes higher, it means that a higher discharge capacity retaining rate at a high current rate is obtained.

Discharging at $1^{st}$ cycle (0.2 C): Charging current 0.3 $mA/cm^2$
Discharging at $2^{nd}$ cycle (10 C): 15 $mA/cm^2$ Comparative Example 1-1

Lithium carbonate ($Li_2CO_3$) and nickel-cobalt mixed metal hydroxide ($Ni_{0.85}Co_{0.15}(OH)_2$, average particle diameter 10 μm) were precisely weighed so as to have a molar ratio of Li:Ni:Co of 1.30:0.85:1.15, and these were dry-mixed using an agate mortar to obtain a mixture. Next, the mixture was put into a calcining container made of alumina, retained using an electric furnace at 650° C. in an oxygen atmosphere for 1 hour so as to be calcined, and cooled to room temperature, and then the resultant calcined product was pulverized so that a lithium mixed metal oxide $C_{101}$ was obtained. As a result of the powder X-ray diffraction measurements of the lithium mixed metal oxide $C_{101}$, in a powder X-ray diffraction pattern, a peak of a lithium mixed metal oxide belonging to the R-3m space group corresponding to a layered rock salt-type crystal structure was confirmed.

The composition analysis of the lithium mixed metal oxide $C_{101}$ was carried out and found to have a molar ratio of Li:Ni:Co of 1.15:0.85:0.15.

By using the lithium mixed metal oxide $C_{101}$, a nonaqueous electrolyte secondary battery $C_{101}$ was manufactured in the same manner as described earlier. The manufacture method of electrode 1 was selected. Cycling tests were carried out on the nonaqueous electrolyte secondary battery $C_{101}$, and cycling behaviors were confirmed and found that the discharge capacity at the $2^{nd}$ cycle becomes slightly larger than the discharge capacity at the $1^{st}$ cycle.

When the discharging rate test 1 was carried out on the nonaqueous electrolyte secondary battery $C_{101}$, the discharge capacities (mAh/g) at 0.2 C and 5 C were found to be 181 and 28, respectively, with the discharge capacity retaining rate (%) at 5 C being 15.

Example 1-1 (Inactive Flux: KCl)

To the mixture of Comparative Example 1-1 was further added potassium chloride (KCl) and mixed. The molar ratio of Li:Ni:Co:KCl in the resultant mixture containing the inactive flux was set to 1.30:0.85:0.15:0.10 (the inactive flux was present in an amount of 15 parts by weight per 100 parts by weight of the lithium compound in the mixture). Next, the mixture was put into a calcining container made of alumina, retained using an electric furnace at 650° C. in an oxygen atmosphere for 1 hour so as to be calcined, and cooled to room temperature; the resultant calcined product was pulverized, then washed with distilled water by decantation, and filtrated and dried at 100° C. for 8 hours so that a lithium mixed metal oxide $R_{101}$ was obtained. As a result of the powder X-ray diffraction measurements of the lithium mixed metal oxide $R_{101}$, in a powder X-ray diffraction pattern, a peak of a lithium mixed metal oxide belonging to the R-3m space group corresponding to a layered rock salt-type crystal structure was confirmed.

The composition analysis of the lithium mixed metal oxide $R_{101}$ was carried out and found to have a molar ratio of Li:Ni:Co of 1.12:0.85:0.15.

By using the lithium mixed metal oxide $R_{101}$, a nonaqueous electrolyte secondary battery $R_{101}$ was manufactured in the same manner as described earlier. The manufacture method of electrode 1 was selected. Cycling tests were carried out on the nonaqueous electrolyte secondary battery $R_{101}$, and cycling behaviors were confirmed so that the discharge capacity at the 1$^{st}$ cycle and the discharge capacity at the 2$^{nd}$ cycle were virtually the same degree, and even when the cycling tests were further carried out, the discharge capacity was reduced monotonically, and no problem was confirmed in the cycling behaviors.

Example 1-2 (Inactive Flux: NaCl)

To the mixture of Comparative Example 1-1 was further added sodium chloride (NaCl) and mixed. The molar ratio of Li:Ni:Co:NaCl in the resultant mixture containing the inactive flux was set to 1.30:0.85:0.15:0.10 (the inactive flux was present in an amount of 12 parts by weight per 100 parts by weight of the lithium compound in the mixture). Next, the mixture was put into a calcining container made of alumina, retained using an electric furnace at 650° C. in an oxygen atmosphere for 1 hour so as to be calcined, and cooled to room temperature; the resultant calcined product was pulverized, then washed with distilled water by decantation, and filtrated and dried at 100° C. for 8 hours so that a lithium mixed metal oxide $R_{102}$ was obtained. As a result of the powder X-ray diffraction measurements of the lithium mixed metal oxide $R_{102}$, in a powder X-ray diffraction pattern, a peak of a lithium mixed metal oxide belonging to the R-3m space group corresponding to a layered rock salt-type crystal structure was confirmed.

The composition analysis of the lithium mixed metal oxide $R_{102}$ was carried out and found to have a molar ratio of Li:Ni:Co of 1.13:0.85:0.15.

By using the lithium mixed metal oxide $R_{102}$, a nonaqueous electrolyte secondary battery $R_{102}$ was manufactured in the same manner as described earlier. The manufacture method of electrode 1 was selected. Cycling tests were carried out on the nonaqueous electrolyte secondary battery $R_{102}$, and cycling behaviors were confirmed so that the discharge capacity at the 1$^{st}$ cycle and the discharge capacity at the 2$^{nd}$ cycle were virtually the same degree, and even when the cycling tests were further carried out, the discharge capacity was reduced monotonically, and no problem was confirmed in the cycling behaviors.

Example 1-3 (Inactive Flux: $K_2CO_3$)

To the mixture of Comparative Example 1-1 was further added potassium carbonate ($K_2CO_3$) and mixed. The molar ratio of Li:Ni:Co:$K_2CO_3$ in the resultant mixture containing the inactive flux was set to 1.30:0.85:0.15:0.10 (the inactive flux was present in an amount of 28 parts by weight per 100 parts by weight of the lithium compound in the mixture). Next, the mixture was put into a calcining container made of alumina, retained using an electric furnace at 650° C. in an oxygen atmosphere for 1 hour so as to be calcined, and cooled to room temperature; the resultant calcined product was pulverized, then washed with distilled water by decantation, and filtrated and dried at 100° C. for 8 hours so that a lithium mixed metal oxide $R_{103}$ was obtained. As a result of powder X-ray diffraction measurements of the lithium mixed metal oxide $R_{103}$, in a powder X-ray diffraction pattern, a peak of a lithium mixed metal oxide belonging to the R-3m space group corresponding to a layered rock salt-type crystal structure was confirmed.

The composition analysis of the lithium mixed metal oxide $R_{103}$ was carried out and found to have a molar ratio of Li:Ni:Co of 1.13:0.85:0.15.

By using the lithium mixed metal oxide $R_{103}$, a nonaqueous electrolyte secondary battery $R_{103}$ was manufactured in the same manner as described earlier. The manufacture method of electrode 1 was selected. Cycling tests were carried out on the nonaqueous electrolyte secondary battery $R_{103}$, and cycling behaviors were confirmed so that the discharge capacity at the 1$^{st}$ cycle and the discharge capacity at the 2$^{nd}$ cycle were virtually the same degree, and even when the cycling tests were further carried out, the discharge capacity was reduced monotonically, and no problem was confirmed in the cycling behaviors.

Example 1-4 (Inactive Flux: $Na_2CO_3$)

To the mixture of Comparative Example 1-1 was further added potassium carbonate ($Na_2CO_3$) and mixed. The molar ratio of Li:Ni:Co:$Na_2CO_3$ in the resultant mixture containing the inactive flux was set to 1.30:0.85:0.15:0.10 (the inactive flux was present in an amount of 22 parts by weight per 100 parts by weight of the lithium compound in the mixture). Next, the mixture was put into a calcining container made of alumina, retained using an electric furnace at 650° C. in an oxygen atmosphere for 1 hour so as to be calcined, and cooled to room temperature; the resultant calcined product was pulverized, then washed with distilled water by decantation, and filtrated and dried at 100° C. for 8 hours so that a lithium mixed metal oxide $R_{104}$ was obtained. As a result of the powder X-ray diffraction measurements of the lithium mixed metal oxide $R_{104}$, in a powder X-ray diffraction pattern, a peak of a lithium mixed metal oxide belonging to the R-3m space group corresponding to a layered rock salt-type crystal structure was confirmed.

The composition analysis of the lithium mixed metal oxide $R_{104}$ was carried out and found to have a molar ratio of Li:Ni:Co of 1.10:0.85:0.15.

By using the lithium mixed metal oxide $R_{104}$, a nonaqueous electrolyte secondary battery $R_{104}$ was manufactured in the same manner as described earlier. The manufacture method of electrode 1 was selected. Cycling tests were carried out on the nonaqueous electrolyte secondary battery $R_{104}$, and cycling behaviors were confirmed so that the discharge capacity at the 1$^{st}$ cycle and the discharge capacity at the 2$^{nd}$ cycle were virtually the same degree, and even when the cycling tests were further carried out, the discharge capacity was reduced monotonically, and no problem was confirmed in the cycling behaviors.

Comparative Example 1-2

A lithium mixed metal oxide $C_{102}$ was obtained in the same manner as in Comparative Example 1 except that the mixture was put into a calcining container made of alumina, and retained using an electric furnace at 750° C. in an oxygen atmosphere for 1 hour so as to be calcined. As a result of the powder X-ray diffraction measurements of the lithium mixed metal oxide $C_{102}$, in a powder X-ray diffraction pattern, a peak of a lithium mixed metal oxide belonging to the R-3m space group corresponding to a layered rock salt-type crystal structure was confirmed.

The composition analysis of the lithium mixed metal oxide $C_{102}$ was carried out and found to have a molar ratio of Li:Ni:Co of 1.10:0.85:0.15.

By using the lithium mixed metal oxide $C_{102}$, a nonaqueous electrolyte secondary battery $C_{102}$ was manufactured in the same manner as described earlier. The manufacture method of electrode 1 was selected. Cycling tests were carried out on the nonaqueous electrolyte secondary battery $C_{102}$, and cycling behaviors were confirmed and found that the discharge capacity at the $2^{nd}$ cycle becomes slightly larger than the discharge capacity at the $1^{st}$ cycle.

When the discharging rate test 1 was carried out on the nonaqueous electrolyte secondary battery $C_{102}$, the discharge capacities (mANg) at 0.2 C and 5 C were found to be 93 and 7, respectively, with the discharge capacity retaining rate (%) at 5 C being 8.

Example 1-5 (Inactive Flux: $Na_2CO_3$)

A lithium mixed metal oxide $R_{105}$ was obtained in the same manner as in Example 1-4 except that the mixture was put into a calcining container made of alumina, and retained using an electric furnace at 750° C. in an oxygen atmosphere for 1 hour so as to be calcined. As a result of the powder X-ray diffraction measurements of the lithium mixed metal oxide $R_{105}$, in a powder X-ray diffraction pattern, a peak of a lithium mixed metal oxide belonging to the R-3m space group corresponding to a layered rock salt-type crystal structure was confirmed.

The composition analysis of the lithium mixed metal oxide $R_{105}$ was carried out and found to have a molar ratio of Li:Ni:Co of 1.11:0.85:0.15.

By using the lithium mixed metal oxide $R_{105}$, a nonaqueous electrolyte secondary battery $R_{105}$ was manufactured in the same manner as described earlier. The manufacture method of electrode 1 was selected. Cycling tests were carried out on the nonaqueous electrolyte secondary battery $R_{105}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

Comparative Example 1-3

A nickel sulfate hexahydrate was used as a water-soluble nickel salt, a manganese sulfate monohydrate was used as a water-soluble manganese salt, and a cobalt sulfate heptahydrate was used as a water-soluble cobalt salt, and these components were precisely weighed so as to have a molar ratio of Ni:Mn:Co of 0.50:0.30:0.20, respectively, and dissolved in pure water so that an aqueous transition metal solution containing Ni, Mn and Co was obtained. To this aqueous transition metal solution was added an aqueous potassium hydroxide solution as an aqueous alkali metal solution to cause coprecipitation, followed by generating a precipitation so that a slurry was obtained. The resultant slurry was solid-liquid separated, and washed with distilled water so that a transition metal mixed hydroxide was obtained. The resultant was dried at 150° C. so that a coprecipitation product $B_{103}$ was obtained.

The coprecipitation product $B_{103}$ and lithium carbonate were mixed in a mortar so that a mixture was obtained. Next, the mixture was put into a calcining container made of alumina, retained using an electric furnace at 1000° C. in the atmospheric air for 6 hour so as to be calcined, and cooled to room temperature to obtain a calcined product; the resultant product was pulverized, washed with distilled water by decantation, and filtrated and dried at 300° C. for 6 hours so that a powder $C_{103}$ was obtained. As a result of the powder X-ray diffraction measurements of the lithium mixed metal oxide $C_{103}$, in a powder X-ray diffraction pattern, a peak of a lithium mixed metal oxide belonging to the R-3m space group corresponding to a layered rock salt-type crystal structure was confirmed.

The composition analysis of the lithium mixed metal oxide $C_{103}$ was carried out and found to have a molar ratio of Li:Ni:Mn:Co of 1.15:0.50:0.30:0.20.

By using the lithium mixed metal oxide $C_{103}$, a nonaqueous electrolyte secondary battery $C_{103}$ was manufactured in the same manner as described earlier. The manufacture method of electrode 2 was selected. Cycling tests were carried out on the nonaqueous electrolyte secondary battery $C_{103}$, and cycling behaviors were confirmed and found that the discharge capacity at the $2^{nd}$ cycle becomes slightly larger than the discharge capacity at the $1^{st}$ cycle.

When the discharging rate test 1 was carried out on the nonaqueous electrolyte secondary battery $C_{103}$, the discharge capacities (mAh/g) at 0.2 C and 5 C were found to be 133 and 85, respectively, with the discharge capacity retaining rate (%) at 5 C being 64.

Example 1-6 (Inactive Flux: $K_2SO_4$)

A coprecipitation product $Q_{106}$ was obtained by carrying out the same operation as in Comparative Example 1-3. The coprecipitation product $Q_{106}$, lithium carbonate and potassium sulfate serving as an inactive flux were mixed in a mortar so that a mixture was obtained. Next, the mixture was put into a calcining container made of alumina, retained using an electric furnace at 850° C. in the atmospheric air for 6 hour so as to be calcined, and cooled to room temperature to obtain a calcined product; the resultant product was pulverized, washed with distilled water by decantation, and filtrated and dried at 300° C. for 6 hours so that a powdery lithium mixed metal oxide $R_{106}$ was obtained. As a result of the powder X-ray diffraction measurements of the $R_{106}$, in a powder X-ray diffraction pattern, a peak of a lithium mixed metal oxide belonging to the R-3m space group corresponding to a layered rock salt-type crystal structure was confirmed.

As a result of the composition analysis of the lithium mixed metal oxide $R_{106}$, the molar ratio of Li:Ni:Mn:Co was 1.13:0.50:0.30:0.20.

By using the lithium mixed metal oxide $R_{106}$, a nonaqueous electrolyte secondary battery $R_{106}$ was manufactured in the same manner as described earlier. The manufacture method of electrode 2 was selected. Cycling tests were carried out on the nonaqueous electrolyte secondary battery $R_{106}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{106}$, the discharge capacities (mAh/g) at 0.2 C and 5 C were found to be 170 and 151, respectively, with the discharge capacity retaining rate (%) at 5 C being 89; thus, the discharge capacity retaining rate was high at a high current rate.

Example 1-7 (Inactive Flux: $K_2SO_4$)

A lithium mixed metal oxide $R_{107}$ was obtained in the same operation as in Example 1-6 except that the molar ratio of Ni:Mn:Co was set to 0.60:0.30:0.10. As a result of the powder X-ray diffraction measurements of the lithium mixed metal oxide $R_{107}$, in a powder X-ray diffraction pattern, a peak of a lithium mixed metal oxide belonging to the R-3m space group corresponding to a layered rock salt-type crystal structure was confirmed.

As a result of the composition analysis of the lithium mixed metal oxide $R_{107}$, the molar ratio of Li:Ni:Mn:Co was 1.10:0.60:0.30:0.10.

By using the lithium mixed metal oxide $R_{107}$, a nonaqueous electrolyte secondary battery $R_{107}$ was manufactured in the same manner as described earlier. The manufacture method of electrode 2 was selected. Cycling tests were carried out on the nonaqueous electrolyte secondary battery $R_{107}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{107}$, the discharge capacities (mAh/g) at 0.2 C and 5 C were found to be 174 and 139, respectively, with the discharge capacity retaining rate (%) at 5 C being 80; thus, the discharge capacity retaining rate was high at a high current rate.

Example 1-8 (Inactive Flux: $K_2SO_4$)

A lithium mixed metal oxide $R_{108}$ was obtained in the same operation as in Example 1-6 except that the molar ratio of Ni:Mn:Co was set to 0.60:0.20:0.20. As a result of the powder X-ray diffraction measurements of the lithium mixed metal oxide $R_{108}$, in a powder X-ray diffraction pattern, a peak of a lithium mixed metal oxide belonging to the R-3m space group corresponding to a layered rock salt-type crystal structure was confirmed.

As a result of the composition analysis of the lithium mixed metal oxide $R_{108}$, the molar ratio of Li:Ni:Mn:Co was 1.09:0.60:0.20:0.20.

By using the lithium mixed metal oxide $R_{108}$, a nonaqueous electrolyte secondary battery $R_{108}$ was manufactured in the same manner as described earlier. The manufacture method of electrode 2 was selected. Cycling tests were carried out on the nonaqueous electrolyte secondary battery $R_{108}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{108}$, the discharge capacities (mANg) at 0.20 and 5 C were found to be 175 and 140, respectively, with the discharge capacity retaining rate (%) at 5 C being 80; thus, the discharge capacity retaining rate was high at a high current rate.

Example 1-9 (Inactive Flux: $K_2SO_4$)

A lithium mixed metal oxide $R_{109}$ was obtained in the same operation as in Example 1-6 except that the calcining temperature was set to 800° C. As a result of the powder X-ray diffraction measurements of the lithium mixed metal oxide $R_{109}$, in a powder X-ray diffraction pattern, a peak of a lithium mixed metal oxide belonging to the R-3m space group corresponding to a layered rock salt-type crystal structure was confirmed.

As a result of the composition analysis of the lithium mixed metal oxide $R_{109}$, the molar ratio of Li:Ni:Mn:Co was 1.12:0.50:0.30:0.20.

By using the lithium mixed metal oxide $R_{109}$, a nonaqueous electrolyte secondary battery $R_{109}$ was manufactured in the same manner as described earlier. The manufacture method of electrode 2 was selected. Cycling tests were carried out on the nonaqueous electrolyte secondary battery $R_{109}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{109}$, the discharge capacities (mAh/g) at 0.2 C and 5 C were found to be 168 and 149, respectively, with the discharge capacity retaining rate (%) at 5 C being 88; thus, the discharge capacity retaining rate was high at a high current rate Example 1-10 (Inactive Flux: $K_2SO_4$)

A lithium mixed metal oxide $R_{110}$ was obtained in the same operation as in Example 1-6 except that the molar ratio of Ni:Mn:Co was set to 0.33:0.34:0.33. As a result of the powder X-ray diffraction measurements of the lithium mixed metal oxide $R_{110}$, in a powder X-ray diffraction pattern, a peak of a lithium mixed metal oxide belonging to the R-3m space group corresponding to a layered rock salt-type crystal structure was confirmed.

As a result of the composition analysis of the lithium mixed metal oxide $R_{110}$, the molar ratio of Li:Ni:Mn:Co was 1.07:0.33:0.34:0.33.

By using the lithium mixed metal oxide $R_{110}$, a nonaqueous electrolyte secondary battery $R_{110}$ was manufactured in the same manner as described earlier. The manufacture method of electrode 2 was selected. Cycling tests were carried out on the nonaqueous electrolyte secondary battery $R_{110}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{110}$, the discharge capacities (mAh/g) at 0.2 C and 50 were found to be 161 and 149, respectively, with the discharge capacity retaining rate (%) at 5 C being 92; thus, the discharge capacity retaining rate was high at a high current rate.

Example 1-11 (Inactive Flux: $K_2CO_3$)

A lithium mixed metal oxide $R_{111}$ was obtained in the same operation as in Example 1-6 except that potassium carbonate was used as an inactive flux. As a result of the powder X-ray diffraction measurements of the lithium mixed metal oxide $R_{111}$, in a powder X-ray diffraction pattern, a peak of a lithium mixed metal oxide belonging to the R-3m space group corresponding to a layered rock salt-type crystal structure was confirmed.

As a result of the composition analysis of the lithium mixed metal oxide $R_{111}$, the molar ratio of Li:Ni:Mn:Co was 1.11:0.50:0.30:0.20.

By using the lithium mixed metal oxide $R_{111}$, a nonaqueous electrolyte secondary battery $R_{111}$ was manufactured in the same manner as described earlier. The manufacture method of electrode 2 was selected. Cycling tests were carried out on the nonaqueous electrolyte secondary battery $R_{111}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{111}$, the discharge capacities (mAh/g) at 0.2 C and 5 C were found to be 167 and 149, respectively, with the discharge capacity retaining rate (%) at 5 C being 89; thus, the discharge capacity retaining rate was high at a high current rate.

Example 1-12 (Inactive Flux: $K_2CO_3$)

A lithium mixed metal oxide $R_{112}$ was obtained in the same operation as in Example 1-11 except that the molar ratio of Ni:Mn:Co was set to 0.33:0.34:0.33. As a result of the powder X-ray diffraction measurements of the lithium mixed metal oxide $R_{112}$, in a powder X-ray diffraction pattern, a peak of a lithium mixed metal oxide belonging to the R-3m space group corresponding to a layered rock salt-type crystal structure was confirmed.

As a result of the composition analysis of the lithium mixed metal oxide $R_{112}$, the molar ratio of Li:Ni:Mn:Co was 1.11:0.33:0.34:0.33.

By using the lithium mixed metal oxide $R_{112}$, a nonaqueous electrolyte secondary battery $R_{112}$ was manufactured in the same manner as described earlier. The manufacture method of electrode 2 was selected. Cycling tests were carried out on the nonaqueous electrolyte secondary battery $R_{112}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{112}$, the discharge capacities (mAh/g) at 0.2 C and 5 C were found to be 160 and 140, respectively, with the discharge capacity retaining rate (%) at 5 C being 88; thus, the discharge capacity retaining rate was high at a high current rate.

Example 1-13 (Inactive Flux: $K_2CO_3$)

A lithium mixed metal oxide $R_{113}$ was obtained in the same operation as in Example 1-11 except that the molar ratio of Ni:Mn:Co was set to 0.60:0.30:0.10. As a result of the powder X-ray diffraction measurements of the lithium mixed metal oxide $R_{113}$, in a powder X-ray diffraction pattern, a peak of a lithium mixed metal oxide belonging to the R-3m space group corresponding to a layered rock salt-type crystal structure was confirmed.

As a result of the composition analysis of the lithium mixed metal oxide $R_{113}$, the molar ratio of Li:Ni:Mn:Co was 1.10:0.60:0.30:0.10.

By using the lithium mixed metal oxide $R_{113}$, a nonaqueous electrolyte secondary battery $R_{113}$ was manufactured in the same manner as described earlier. The manufacture method of electrode 2 was selected. Cycling tests were carried out on the nonaqueous electrolyte secondary battery $R_{113}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{113}$, the discharge capacities (mAh/g) at 0.2 C and 5 C were found to be 174 and 139, respectively, with the discharge capacity retaining rate (%) at 5 C being 80; thus, the discharge capacity retaining rate was high at a high current rate.

Example 1-14 (Inactive Flux: $K_2CO_3$)

A lithium mixed metal oxide $R_{114}$ was obtained in the same operation as in Example 1-11 except that the molar ratio of Ni:Mn:Co was set to 0.60:0.20:0.20. As a result of the powder X-ray diffraction measurements of the lithium mixed metal oxide $R_{114}$, in a powder X-ray diffraction pattern, a peak of a lithium mixed metal oxide belonging to the R-3m space group corresponding to a layered rock salt-type crystal structure was confirmed.

As a result of the composition analysis of the lithium mixed metal oxide $R_{114}$, the molar ratio of Li:Ni:Mn:Co was 1.09:0.60:0.20:0.20.

By using the lithium mixed metal oxide $R_{114}$, a nonaqueous electrolyte secondary battery $R_{114}$ was manufactured in the same manner as described earlier. The manufacture method of electrode 2 was selected. Cycling tests were carried out on the nonaqueous electrolyte secondary battery $R_{114}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{114}$, the discharge capacities (mAh/g) at 0.2 C and 5 C were found to be 177 and 143, respectively, with the discharge capacity retaining rate (%) at 5 C being 80; thus, the discharge capacity retaining rate was high at a high current rate.

Example 1-15 (Inactive Flux: $K_2SO_4$)

A nickel sulfate hexahydrate was used as a water-soluble nickel salt, a manganese sulfate monohydrate was used as a water-soluble manganese salt, and a cobalt sulfate heptahydrate was used as a water-soluble cobalt salt, and these components were precisely weighed so as to have a molar ratio of Ni:Mn:Co of 0.33:0.34:0.33, respectively, and dissolved in pure water so that an aqueous transition metal solution containing Ni, Mn and Co was obtained. An aqueous ammonium sulfate solution was used as a complexing agent, and an aqueous sodium hydroxide solution was used as an aqueous alkali metal solution. Next, by simultaneously loading the aqueous transition metal solution, the complexing agent and the aqueous alkali metal solution into a reaction vessel, coprecipitation was carried out to generate a precipitate so that a coprecipitation slurry was obtained. At the time of the coprecipitation, the amount of the aqueous sodium hydroxide solution loaded was adjusted so as to retain the pH in the reaction vessel at 12, and the temperature in the reaction vessel was adjusted to 45° C. Moreover, the inside of the reaction vessel was stirred by stirring blades. The resultant coprecipitation slurry was subjected to solid-liquid separation, and washed with distilled water so that a transition metal mixed hydroxide was obtained, and dried at 100° C. to obtain a coprecipitation product $Q_{115}$.

The coprecipitation product $Q_{115}$, a lithium hydroxide monohydrate and potassium sulfate were mixed in a mortar so that a mixture was obtained. Next, the mixture was put into a calcining container made of alumina, retained using an electric furnace at 800° C. in the atmospheric air for 6 hour so as to be calcined, and cooled to room temperature to obtain a calcined product; the resultant product was pulverized, washed with distilled water by decantation, and filtrated and dried at 300° C. for 6 hours so that a powdery lithium mixed metal oxide $R_{115}$ was obtained. As a result of the powder X-ray diffraction measurements of the $R_{115}$, in a powder X-ray diffraction pattern, a peak of a lithium mixed metal oxide belonging to the R-3m space group corresponding to a layered rock salt-type crystal structure was confirmed.

As a result of the composition analysis of the lithium mixed metal oxide $R_{115}$, the molar ratio of Li:Ni:Mn:Co was 1.09:0.33:0.34:0.33.

By using the lithium mixed metal oxide $R_{115}$, a nonaqueous electrolyte secondary battery $R_{115}$ was manufactured in the same manner as described earlier. The manufacture method of electrode 2 was selected. Cycling tests were carried out on the nonaqueous electrolyte secondary battery $R_{115}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{115}$, the discharge capacities (mAh/g) at 0.2 C and 5 C were found to be 154 and 127, respectively, with the discharge capacity retaining rate (%) at 5 C being 82; the discharge capacity retaining rate was high at a high current rate.

Example 1-16 (Inactive Flux: $K_2SO_4$)

A powdery lithium mixed metal oxide $R_{116}$ was obtained in the same operation as in Example 1-6 except that the molar ratio of Ni:Mn:Co was set to 0.47:0.48:0.05. As a result of the powder X-ray diffraction measurements of the $R_{116}$, in a powder X-ray diffraction pattern, a peak of a lithium mixed metal oxide belonging to the R-3m space group corresponding to a layered rock salt-type crystal structure was confirmed.

As a result of the composition analysis of the $R_{116}$, the molar ratio of Li:Ni:Mn:Co was 1.05:0.47:0.48:0.05, and the BET specific surface area was 8.1 $m^2/g$. The $R_{211}$ had an average particle diameter of 0.2 μm, and an average primary particle diameter of 0.2 μm.

By using the lithium mixed metal oxide $R_{116}$, a nonaqueous electrolyte secondary battery $R_{116}$ was manufactured in the same manner as described earlier. The manufacture method of electrode 2 was selected. Cycling tests were carried out on the nonaqueous electrolyte secondary battery $R_{116}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{116}$, the discharge capacities (MAh/g) at 0.2 C and 5 C were found to be 149 and 133, respectively, with the discharge capacity retaining rate (%) at 5 C being 89; thus, the discharge capacity retaining rate was high at a high current rate.

Example 1-17 (Inactive Flux: $K_2SO_4$)

A powdery lithium mixed metal oxide $R_{117}$ was obtained in the same operation as in Example 1-6 except that the molar ratio of Ni:Mn:Co was set to 0.40:0.50:0.10. As a result of the powder X-ray diffraction measurements of the $R_{117}$, in a powder X-ray diffraction pattern, a peak of a lithium mixed metal oxide belonging to the R-3m space group corresponding to a layered rock salt-type crystal structure was confirmed.

As a result of the composition analysis of the $R_{117}$, the molar ratio of Li:Ni:Mn:Co was 1.04:0.40:0.50:0.10, and the BET specific surface area was 8.4 $m^2/g$. The $R_{117}$ had an average particle diameter of 0.2 μm, and an average primary particle diameter of 0.2 μm.

By using the lithium mixed metal oxide $R_{117}$, a nonaqueous electrolyte secondary battery $R_{117}$ was manufactured in the same manner as described earlier. The manufacture method of electrode 2 was selected. Cycling tests were carried out on the nonaqueous electrolyte secondary battery $R_{117}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 1 was carried out on the nonaqueous electrolyte secondary battery $R_{117}$, the discharge capacities (mAh/g) at 0.2 C and 5 C were found to be 152 and 137, respectively, with the discharge capacity retaining rate (%) at 5 C being 90; thus, the discharge capacity retaining rate was high at a high current rate.

Comparative Example 2-1

A nickel sulfate hexahydrate was used as a water-soluble nickel salt, a manganese sulfate monohydrate was used as a water-soluble manganese salt, and a cobalt sulfate heptahydrate was used as a water-soluble cobalt salt, and these components were precisely weighed so as to have a molar ratio of Ni:Mn:Co of 0.45:0.45:0.10, respectively, and dissolved in pure water so that an aqueous transition metal solution containing Ni, Mn and Co was obtained. An aqueous ammonium sulfate solution was used as a complexing agent, and an aqueous sodium hydroxide solution was used as an aqueous alkali metal solution. Next, by simultaneously loading the aqueous transition metal solution, the complexing agent and the aqueous alkali metal solution into a reaction vessel, coprecipitation was carried out to generate a precipitate so that a coprecipitation slurry was obtained. At the time of the coprecipitation, the amount of the aqueous sodium hydroxide solution loaded was adjusted so as to retain the pH in the reaction vessel at 12, and the temperature in the reaction vessel was adjusted to 45° C. Moreover, the inside of the reaction vessel was stirred by stirring blades. The resultant coprecipitation slurry was subjected to solid-liquid separation, and washed with distilled water so that a transition metal mixed hydroxide was obtained, and dried at 100° C. to obtain a coprecipitation product $B_{201}$.

The coprecipitation product $B_{201}$, a lithium hydroxide monohydrate and potassium sulfate were mixed in a mortar so that a mixture was obtained. Next, the mixture was put into a calcining container made of alumina, retained using an electric furnace at 800° C. in the atmospheric air for 6 hour so as to be calcined, and cooled to room temperature to obtain a calcined product; the resultant product was pulverized, washed with distilled water by decantation, and filtrated and dried at 300° C. for 6 hours so that a powdery lithium mixed metal oxide $C_{201}$ was obtained. As a result of the powder X-ray diffraction measurements of the $C_{201}$, in a powder X-ray diffraction pattern, a peak of a lithium mixed metal oxide belonging to the R-3m space group corresponding to a layered rock salt-type crystal structure was confirmed.

As a result of the composition analysis of the $C_{201}$, the molar ratio of Li:Ni:Mn:Co was 1.05:0.45:0.45:0.10, and the BET specific surface area was 0.3 m$^2$/g. The $C_{201}$ had an average particle diameter of 8.8 μm, and an average primary particle diameter of 1.3 μm.

By using the lithium mixed metal oxide $C_{201}$, a nonaqueous electrolyte secondary battery $C_{201}$ was manufactured in the same manner as described earlier. The manufacture method of electrode 2 was selected. Cycling tests were carried out on the nonaqueous electrolyte secondary battery $C_{201}$, and cycling behaviors were confirmed and found that the discharge capacity at the 2$^{nd}$ cycle becomes slightly larger than the discharge capacity at the 1$^{st}$ cycle.

When the discharging rate test 2 was carried out on the nonaqueous electrolyte secondary battery $C_{201}$, the discharge capacities (mAh/g) at 0.2 C and 100 were found to be 154 and 91, respectively, with the discharge capacity retaining rate (%) at 100 being 59.

Comparative Example 2-2

A coprecipitation product $B_{202}$ was obtained in the same operation as in Comparative Example 2-1 except that the molar ratio of Ni:Mn:Co was set to 0.33:0.34:0.33, and then a powdery lithium mixed metal oxide $C_{202}$ was obtained by carrying out the same operation as in Comparative Example 2-1. As a result of the powder X-ray diffraction measurements of the $C_{202}$, in a powder X-ray diffraction pattern, a peak of a lithium mixed metal oxide belonging to the R-3m space group corresponding to a layered rock salt-type crystal structure was confirmed.

As a result of the composition analysis of the $C_{202}$, the molar ratio of Li:Ni:Mn:Co was 1.05:0.33:0.34:0.33, and the BET specific surface area was 0.4 m$^2$/g. The $R^2$ had an average particle diameter of 9.1 μm, and an average primary particle diameter of 1.5 μm.

By using the lithium mixed metal oxide $C_{202}$, a nonaqueous electrolyte secondary battery $C_{202}$ was manufactured in the same manner as described earlier. The manufacture method of electrode 2 was selected. Cycling tests were carried out on the nonaqueous electrolyte secondary battery $C_{202}$, and cycling behaviors were confirmed and found that the discharge capacity at the 2$^{nd}$ cycle becomes slightly larger than the discharge capacity at the 1$^{st}$ cycle.

When the discharging rate test 2 was carried out on the nonaqueous electrolyte secondary battery $C_{202}$, the discharge capacities (mAh/g) at 0.2 C and 100 were found to be 158 and 101, respectively, with the discharge capacity retaining rate (%) at 100 being 64.

Example 2-A

A nickel sulfate hexahydrate was used as a water-soluble nickel salt, a manganese sulfate monohydrate was used as a water-soluble manganese salt, and a cobalt sulfate heptahydrate was used as a water-soluble cobalt salt, and these components were precisely weighed so as to have a molar ratio of Ni:Mn:Co of 0.50:0.30:0.20, respectively, and dissolved in pure water so that an aqueous transition metal solution containing Ni, Mn and Co was obtained. An aqueous potassium hydroxide solution was added to the aqueous transition metal solution as an aqueous alkali metal solution to carry out coprecipitation, followed by generating a precipitate so that a coprecipitation slurry was obtained. The resultant coprecipitation slurry was subjected to solid-liquid separation, and washed with distilled water so that a transition metal mixed hydroxide was obtained, and dried at 150° C. to obtain a coprecipitation product $Q_{204}$.

The $Q_{204}$, lithium carbonate and potassium sulfate as an inactive flux were mixed in a mortar so that a mixture was obtained. Next, the mixture was put into a calcining container made of alumina, retained using an electric furnace at 1000° C. in the atmospheric air for 6 hour so as to be calcined, and cooled to room temperature to obtain a calcined product; the resultant product was pulverized, washed with distilled water by decantation, and filtrated and dried at 300° C. for 6 hours so that a powdery lithium mixed metal oxide $R_{204}$ was obtained. As a result of the powder X-ray diffraction measurements of the $R_{204}$, in a powder X-ray diffraction pattern, a peak of a lithium mixed metal oxide belonging to the R-3m space group corresponding to a layered rock salt-type crystal structure was confirmed.

As a result of the composition analysis of the $R_{204}$, the molar ratio of Li:Ni:Mn:Co was 1.10:0.50:0.30:0.20, and the BET specific surface area was 0.3 m$^2$/g. The $R_{204}$ had an average particle diameter of 4.2 μm, and an average primary particle diameter of 3.2 μm.

By using the lithium mixed metal oxide $R_{204}$, a nonaqueous electrolyte secondary battery $R_{204}$ was manufactured in the same manner as described earlier. The manufacture method of electrode 2 was selected. Cycling tests were carried out on the nonaqueous electrolyte secondary battery $R_{204}$, and cycling behaviors were confirmed so that the discharge capacity at the 1$^{st}$ cycle and the discharge capacity at the 2$^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{204}$, the discharge capacities (mAh/g) at 0.2 C and 10 C were found to be 138 and 54, respectively, with the discharge capacity retaining rate (%) at 10 C being 39.

Comparative Example 2-3

A coprecipitation product $B_{203}$ was obtained in the same operation as in Example 2-A except that the molar ratio of Ni:Mn:Co was set to 0.33:0.34:0.33.

The $B_{203}$ and lithium carbonate were mixed in a mortar so that a mixture was obtained. Next, the mixture was put into a calcining container made of alumina, retained using an electric furnace at 850° C. in the atmospheric air for 6 hour so as to be calcined, and cooled to room temperature to obtain a calcined product; the resultant product was pulverized, washed with distilled water by decantation, and filtrated and dried at 300° C. for 6 hours so that a powdery lithium mixed metal oxide $C_{203}$ was obtained. As a result of the powder X-ray diffraction measurements of the $C_{203}$, in a powder X-ray diffraction pattern, a peak of a lithium mixed metal oxide belonging to the R-3m space group corresponding to a layered rock salt-type crystal structure was confirmed.

As a result of the composition analysis of the $C_{203}$, the molar ratio of Li:Ni:Mn:Co was 1.10:0.33:0.34:0.33, and the BET specific surface area was 3.8 m$^2$/g. The $C_{203}$ had an average particle diameter of 1.5 μm, and an average primary particle diameter of 0.2 μm.

By using the lithium mixed metal oxide $C_{203}$, a nonaqueous electrolyte secondary battery $C_{203}$ was manufactured in the same manner as described earlier. The manufacture method of electrode 2 was selected. Cycling tests were carried out on the nonaqueous electrolyte secondary battery $C_{203}$, and cycling behaviors were confirmed and found that the discharge capacity at the $2^{nd}$ cycle becomes slightly larger than the discharge capacity at the $1^{st}$ cycle.

When the discharging rate test 2 was carried out on the nonaqueous electrolyte secondary battery $C_{203}$, the discharge capacities (mAh/g) at 0.2 C and 100 were found to be 141 and 59, respectively, with the discharge capacity retaining rate (%) at 100 being 42.

Example 2-B

A powdery lithium mixed metal oxide $R_{20B}$ was obtained in the same manner as in Example 2-A except that a nickel sulfate hexahydrate was used as a water-soluble nickel salt and a manganese sulfate monohydrate was used as a water-soluble manganese salt, with the molar ratio of Ni:Mn being set to 0.70:0.30, and that the calcining temperature was set to 850° C. As a result of the powder X-ray diffraction measurements of the $R_{20B}$, in a powder X-ray diffraction pattern, a peak of a lithium mixed metal oxide belonging to the R-3m space group corresponding to a layered rock salt-type crystal structure was confirmed.

As a result of the composition analysis of the $R_{20B}$, the molar ratio of Li:Ni:Mn was 1.10:0.70:0.30, and the BET specific surface area was 6.9 m$^2$/g. The $R_{20B}$ had an average particle diameter of 0.2 µm, and an average primary particle diameter of 0.2 µm.

By using the lithium mixed metal oxide $R_{20B}$, a nonaqueous electrolyte secondary battery $R_{20B}$ was manufactured in the same manner as described earlier. The manufacture method of electrode 2 was selected. Cycling tests were carried out on the nonaqueous electrolyte secondary battery $R_{20B}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{20B}$, the discharge capacities (mAh/g) at 0.2 C and 100 were found to be 80 and 3, respectively, with the discharge capacity retaining rate (%) at 10 C being 4.

Example 2-C

A coprecipitation product $Q_{20C}$ was obtained in the same manner as in Comparative Example 2-2. The coprecipitation product $Q_{20C}$, lithium carbonate and potassium sulfate serving as an inactive flux were mixed in a mortar so that a mixture was obtained. Next, the mixture was put into a calcining container made of alumina, retained using an electric furnace at 850° C. in the atmospheric air for 6 hour so as to be calcined, and cooled to room temperature to obtain a calcined product; the resultant product was pulverized, washed with distilled water by decantation, and filtrated and dried at 300° C. for 6 hours so that a powdery lithium mixed metal oxide $R_{20C}$ was obtained. As a result of the powder X-ray diffraction measurements of the $R_{20C}$, in a powder X-ray diffraction pattern, a peak of a lithium mixed metal oxide belonging to the R-3m space group corresponding to a layered rock salt-type crystal structure was confirmed.

As a result of the composition analysis of the $R_{20C}$, the molar ratio of Li:Ni:Mn:Co was 1.09:0.33:0.34:0.33, and the BET specific surface area was 1.2 m$^2$/g. The $R_{20C}$ had an average particle diameter of 7.2 µm, and an average primary particle diameter of 1.0 µm.

By using the lithium mixed metal oxide $R_{20C}$, a nonaqueous electrolyte secondary battery $R_{20C}$ was manufactured in the same manner as described earlier. The manufacture method of electrode 2 was selected. Cycling tests were carried out on the nonaqueous electrolyte secondary battery $R_{20C}$, and cycling behaviors were continued so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{20C}$, the discharge capacities (mAh/g) at 0.2 C and 100 were found to be 152 and 94, respectively, with the discharge capacity retaining rate (%) at 100 being 62.

Reference Example

After lithium carbonate, nickel hydroxide, manganese oxide, cobalt oxide and boric acid had been precisely weighted so that the respective elements had a molar ratio of Li:Ni:Mn:Co:B of 1.08:0.35:0.44:0.21:0.03, these were pulverized and mixed by a dry ball mill using alumina balls of 15 mmφ as media for 4 hours (peripheral rate: 0.7 m/s) so that a powder was obtained. This powder was put into a tunnel-type continuous furnace and retained at 1040° C. in the atmospheric air for 4 hours so as to be calcined so that a calcined product was obtained. The calcined product was pulverized by a dry ball mill using alumina balls of 15 mmφ as media for 7 hours (peripheral rate: 0.7 m/s), and sieved by a mesh having an opening of 45 µm so that coarse particles were removed therefrom; thus, a powdery lithium mixed metal oxide S was obtained. As a result of the powder X-ray diffraction measurements of the S, in a powder X-ray diffraction pattern, a peak of a lithium mixed metal oxide belonging to the R-3m space group corresponding to a layered rock salt-type crystal structure was confirmed.

As a result of the composition analysis of the S, the molar ratio of Li:Ni:Mn:Co was 1.04:0.35:0.44:0.21, and the BET specific surface area was 3.3 m$^2$/g. The S had an average particle diameter of 1.3 µm, and an average primary particle diameter of 1.3 µm.

When the S was used to manufacture a coin-shaped battery and the discharging rate test 2 was carried out thereon, the discharge capacities (mAh/g) at 0.2 C and 10 C were respectively 154 and 79, with the discharge capacity retaining rate (%) at 10 C being 51.

Example 2-1

A powdery lithium mixed metal oxide $R_{201}$ was obtained in the same operation as in Example 2-B except that the molar ratio of Ni:Mn:Co was set to 0.50:0.30:0.20. As a result of the powder X-ray diffraction measurements of the $R_{201}$, in a powder X-ray diffraction pattern, a peak of a lithium mixed metal oxide belonging to the R-3m space group corresponding to a layered rock salt-type crystal structure was confirmed.

As a result of the composition analysis of the $R_{201}$, the molar ratio of Li:Ni:Mn:Co was 1.13:0.50:0.30:0.20, and the BET specific surface area was 6.0 m$^2$/g. The $R_{201}$ had an average particle diameter of 0.2 µm, and an average primary particle diameter of 0.2 µm.

By using the lithium mixed metal oxide $R_{201}$, a nonaqueous electrolyte secondary battery $R_{201}$ was manufactured in the same manner as described earlier. The manufacture method of electrode 2 was selected. Cycling tests were carried out on the nonaqueous electrolyte secondary battery $R_{201}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{201}$, the discharge capacities (mAh/g) at 0.2 C and 10 C were found to be 170 and 138, respectively, with the discharge capacity retaining rate (%) at 10 C being 82; thus, the discharge capacity and the discharge capacity retaining rate were high.

Example 2-2

A powdery lithium mixed metal oxide $R_{202}$ was obtained in the same operation as in Example 2-1 except that the molar ratio of Ni:Mn:Co was set to 0.60:0.30:0.10. As a result of the powder X-ray diffraction measurements of the $R_{202}$, in a powder X-ray diffraction pattern, a peak of a lithium mixed metal oxide belonging to the R-3m space group corresponding to a layered rock salt-type crystal structure was confirmed.

As a result of the composition analysis of the $R_{202}$, the molar ratio of Li:Ni:Mn:Co was 1.10:0.60:0.30:0.10, and the BET specific surface area was 5.4 m$^2$/g. The $R_{202}$ had an average particle diameter of 0.5 μm, and an average primary particle diameter of 0.2 μm.

By using the lithium mixed metal oxide $R_{202}$, a nonaqueous electrolyte secondary battery $R_{202}$ was manufactured in the same manner as described earlier. The manufacture method of electrode 2 was selected. Cycling tests were carried out on the nonaqueous electrolyte secondary battery $R_{202}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{202}$, the discharge capacities (mAh/g) at 0.2 C and 100 were found to be 174 and 124, respectively, with the discharge capacity retaining rate (%) at 100 being 71; thus, the discharge capacity and the discharge capacity retaining rate were high.

Example 2-3

A powdery lithium mixed metal oxide $R_{202}$ was obtained in the same operation as in Example 2-1 except that the molar ratio of Ni:Mn:Co was set to 0.60:0.20:0.20. As a result of the powder X-ray diffraction measurements of the $R_{203}$, in a powder X-ray diffraction pattern, a peak of a lithium mixed metal oxide belonging to the R-3m space group corresponding to a layered rock salt-type crystal structure was confirmed.

As a result of the composition analysis of the $R_{203}$, the molar ratio of Li:Ni:Mn:Co was 1.09:0.60:0.20:0.20, and the BET specific surface area was 3.4 m$^2$/g. The $R_{203}$ had an average particle diameter of 0.5 μm, and an average primary particle diameter of 0.3 μm.

By using the lithium mixed metal oxide $R_{203}$, a nonaqueous electrolyte secondary battery $R_{203}$ was manufactured in the same manner as described earlier. The manufacture method of electrode 2 was selected. Cycling tests were carried out on the nonaqueous electrolyte secondary battery $R_{203}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{203}$, the discharge capacities (mAh/g) at 0.2 C and 10 C were found to be 175 and 124, respectively, with the discharge capacity retaining rate (%) at 10 C being 71; thus, the discharge capacity and the discharge capacity retaining rate were high.

Example 2-4

A powdery lithium mixed metal oxide $R_{204}$ was obtained in the same operation as in Example 2-1 except that the molar ratio of Ni:Mn:Co was set to 0.50:0.30:0.20, and the calcining temperature was set to 800° C. As a result of the powder X-ray diffraction measurements of the $R_{204}$, in a powder X-ray diffraction pattern, a peak of a lithium mixed metal oxide belonging to the R-3m space group corresponding to a layered rock salt-type crystal structure was confirmed.

As a result of the composition analysis of the $R_{204}$, the molar ratio of Li:Ni:Mn:Co was 1.12:0.50:0.30:0.20, and the BET specific surface area was 6.3 m$^2$/g. The $B^4$ had an average particle diameter of 0.2 μm, and an average primary particle diameter of 0.2 μm.

By using the lithium mixed metal oxide $R_{204}$, a nonaqueous electrolyte secondary battery $R_{204}$ was manufactured in the same manner as described earlier. The manufacture method of electrode 2 was selected. Cycling tests were carried out on the nonaqueous electrolyte secondary battery $R_{204}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{204}$, the discharge capacities (mAh/g) at 0.2 C and 100 were found to be 168 and 121, respectively, with the discharge capacity retaining rate (%) at 100 being 72; thus, the discharge capacity and the discharge capacity retaining rate were high.

Example 2-5

A powdery lithium mixed metal oxide $R_{205}$ was obtained in the same operation as in Example 2-1 except that the molar ratio of Ni:Mn:Co was set to 0.33:0.34:0.33. As a result of the powder X-ray diffraction measurements of the $R_{205}$, in a powder X-ray diffraction pattern, a peak of a lithium mixed metal oxide belonging to the R-3m space group corresponding to a layered rock salt-type crystal structure was confirmed.

As a result of the composition analysis of the $R_{205}$, the molar ratio of Li:Ni:Mn:Co was 1.07:0.33:0.34:0.33, and the BET specific surface area was 6.1 m$^2$/g. The $R_{205}$ had an average particle diameter of 0.3 μm, and an average primary particle diameter of 0.2 μm.

By using the lithium mixed metal oxide $R_{205}$, a nonaqueous electrolyte secondary battery $R_{205}$ was manufactured in the same manner as described earlier. The manufacture method of electrode 2 was selected. Cycling tests were carried out on the nonaqueous electrolyte secondary battery $R_{205}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{205}$, the discharge capacities (mAh/g) at 0.2 C and 10 C were found to be 161 and 129, respectively, with the discharge capacity retaining rate (%) at 10 C being 80; thus, the discharge capacity and the discharge capacity retaining rate were high.

Example 2-6

A powdery lithium mixed metal oxide $R_{206}$ was obtained in the same operation as in Example 2-1 except that potassium carbonate was used as the inactive flux. As a result of the powder X-ray diffraction measurements of the $R_{206}$, in a powder X-ray diffraction pattern, a peak of a lithium mixed metal oxide belonging to the R-3m space group corresponding to a layered rock salt-type crystal structure was confirmed.

As a result of the composition analysis of the $R_{206}$, the molar ratio of Li:Ni:Mn:Co was 1.11:0.50:0.30:0.20, and the BET specific surface area of 5.9 $m^2/g$. The $R_{206}$ had an average particle diameter of 0.2 μm, and an average primary particle diameter of 0.2 μm.

By using the lithium mixed metal oxide $R_{206}$, a nonaqueous electrolyte secondary battery $R_{206}$ was manufactured in the same manner as described earlier. The manufacture method of electrode 2 was selected. Cycling tests were carried out on the nonaqueous electrolyte secondary battery $R_{206}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{206}$, the discharge capacities (mAh/g) at 0.2 C and 10 C were found to be 167 and 140, respectively, with the discharge capacity retaining rate (%) at 10 C being 83; thus, the discharge capacity and the discharge capacity retaining rate were high.

Example 2-7

A powdery lithium mixed metal oxide $R_{207}$ was obtained in the same operation as in Example 2-6 except that the molar ratio of Ni:Mn:Co was set to 0.33:0.34:0.33. As a result of the powder X-ray diffraction measurements of the $R_{207}$, in a powder X-ray diffraction pattern, a peak of a lithium mixed metal oxide belonging to the R-3m space group corresponding to a layered rock salt-type crystal structure was confirmed.

As a result of the composition analysis of the $R_{207}$, the molar ratio of Li:Ni:Mn:Co was 1.11:0.33:0.34:0.33, and the BET specific surface area was 5.6 $m^2/g$. The $R_{207}$ had an average particle diameter of 0.6 μm, and an average primary particle diameter of 0.2 μm.

By using the lithium mixed metal oxide $R_{207}$, a nonaqueous electrolyte secondary battery $R_{207}$ was manufactured in the same manner as described earlier. The manufacture method of electrode 2 was selected. Cycling tests were carried out on the nonaqueous electrolyte secondary battery $R_{207}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{207}$, the discharge capacities (mAh/g) at 0.2 C and 100 were found to be 160 and 130, respectively, with the discharge capacity retaining rate (%) at 100 being 81; thus, the discharge capacity and the discharge capacity retaining rate were high.

Example 2-8

A powdery lithium mixed metal oxide $R_{208}$ was obtained in the same operation as in Example 2-6 except that the molar ratio of Ni:Mn:Co was set to 0.60:0.30:0.10. As a result of the powder X-ray diffraction measurements of the $R_{208}$, in a powder X-ray diffraction pattern, a peak of a lithium mixed metal oxide belonging to the R-3m space group corresponding to a layered rock salt-type crystal structure was confirmed.

As a result of the composition analysis of the $R_{208}$, the molar ratio of Li:Ni:Mn:Co was 1.10:0.60:0.30:0.10, and the BET specific surface area was 5.1 $m^2/g$. The $R_{208}$ had an average particle diameter of 0.2 μm, and an average primary particle diameter of 0.2 μm.

By using the lithium mixed metal oxide $R_{208}$, a nonaqueous electrolyte secondary battery $R_{208}$ was manufactured in the same manner as described earlier. The manufacture method of electrode 2 was selected. Cycling tests were carried out on the nonaqueous electrolyte secondary battery $R_{208}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{208}$, the discharge capacities (mAh/g) at 0.2 C and 10 C were found to be 174 and 121, respectively, with the discharge capacity retaining rate (%) at 100 being 70; thus, the discharge capacity and the discharge capacity retaining rate were high.

Example 2-9

A powdery lithium mixed metal oxide $R_{209}$ was obtained in the same operation as in Example 2-6 except that the molar ratio of Ni:Mn:Co was set to 0.60:0.20:0.20. As a result of the powder X-ray diffraction measurements of the $R_{209}$, in a powder X-ray diffraction pattern, a peak of a lithium mixed metal oxide belonging to the R-3m space group corresponding to a layered rock salt-type crystal structure was confirmed.

As a result of the composition analysis of the $R_{209}$, the molar ratio of Li:Ni:Mn:Co was 1.09:0.60:0.20:0.20, and the BET specific surface area of 3.5 $m^2/g$. The $R_{209}$ had an average particle diameter of 0.2 μm, and an average primary particle diameter of 0.2 μm.

By using the lithium mixed metal oxide $R_{209}$, a nonaqueous electrolyte secondary battery $R_{209}$ was manufactured in the same manner as described earlier. The manufacture method of electrode 2 was selected. Cycling tests were carried out on the nonaqueous electrolyte secondary battery $R_{209}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{209}$, the discharge capacities (mAh/g) at 0.2 C and 100 were found to be 177 and 125, respectively, with the discharge capacity retaining rate (%) at 100 being 71; thus, the discharge capacity and the discharge capacity retaining rate were high.

Example 2-10

A powdery lithium mixed metal oxide $R_{210}$ was obtained in the same operation as in Example 2-1 except that the molar ratio of Ni:Mn:Co was set to 0.50:0.40:0.10. As a result of the powder X-ray diffraction measurements of the $R_{210}$, in a powder X-ray diffraction pattern, a peak of a lithium mixed metal oxide belonging to the R-3m space group corresponding to a layered rock salt-type crystal structure was confirmed.

As a result of the composition analysis of the $R_{210}$, the molar ratio of Li:Ni:Mn:Co was 1.08:0.50:0.40:0.10, and the BET specific surface area of 8.0 $m^2/g$. The $R_{210}$ had an average particle diameter of 0.2 μm, and an average primary particle diameter of 0.2 μm.

By using the lithium mixed metal oxide $R_{210}$, a nonaqueous electrolyte secondary battery $R_{210}$ was manufactured in the same manner as described earlier. The manufacture method of electrode 2 was selected. Cycling tests were carried out on the nonaqueous electrolyte secondary battery $R_{210}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{210}$, the discharge capacities (mAh/g) at 0.2 C and 10 C were found to be 168 and 122, respectively, with the discharge capacity retaining rate (%) at 10 C being 73; thus, the discharge capacity and the discharge capacity retaining rate were high.

Example 2-11

A powdery lithium mixed metal oxide $R_{211}$ was obtained in the same operation as in Example 2-1 except that the molar ratio of Ni:Mn:Co was set to 0.47:0.48:0.05. As a result of the powder X-ray diffraction measurements of the $R_{211}$, in a powder X-ray diffraction pattern, a peak of a lithium mixed metal oxide belonging to the R-3m space group corresponding to a layered rock salt-type crystal structure was confirmed.

As a result of the composition analysis of the $R_{211}$, the molar ratio of Li:Ni:Mn:Co was 1.05:0.47:0.48:0.05, and the BET specific surface area was 8.1 $m^2/g$. The $R_{211}$ had an average particle diameter of 0.2 μm, and an average primary particle diameter of 0.2 μm.

By using the lithium mixed metal oxide $R_{211}$, a nonaqueous electrolyte secondary battery $R_{211}$ was manufactured in the same manner as described earlier. The manufacture method of electrode 2 was selected. Cycling tests were carried out on the nonaqueous electrolyte secondary battery $R_{211}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{211}$, the discharge capacities (mAh/g) at 0.2 C and 10 C were found to be 149 and 117, respectively, with the discharge capacity retaining rate (%) at 100 being 79; thus, the discharge capacity and the discharge capacity retaining rate were high.

Example 2-12

A powdery lithium mixed metal oxide $R_{212}$ was obtained in the same operation as in Example 2-1 except that the molar ratio of Ni:Mn:Co was set to 0.40:0.50:0.10. As a result of the powder X-ray diffraction measurements of the $R_{212}$, in a powder X-ray diffraction pattern, a peak of a lithium mixed metal oxide belonging to the R-3m space group corresponding to a layered rock salt-type crystal structure was confirmed.

As a result of the composition analysis of the $R_{212}$, the molar ratio of Li:Ni:Mn:Co was 1.04:0.40:0.50:0.10, and the BET specific surface area was 8.4 $m^2/g$. The $R_{212}$ had an average particle diameter of 0.2 μm, and an average primary particle diameter of 0.2 μm.

By using the lithium mixed metal oxide $R_{212}$, a nonaqueous electrolyte secondary battery $R_{212}$ was manufactured in the same manner as described earlier. The manufacture method of electrode 2 was selected. Cycling tests were carried out on the nonaqueous electrolyte secondary battery $R_{212}$, and cycling behaviors were confirmed so that the discharge capacity at the $1^{st}$ cycle and the discharge capacity at the $2^{nd}$ cycle were virtually the same degree, and even when the cycling tests were further carried out, the discharge capacity was reduced monotonically, and no problem was confirmed in the cycling behaviors.

When the discharging rate test 2 was carried out on the nonaqueous electrolyte secondary battery $R_{212}$, the discharge capacities (mAh/g) at 0.2 C and 10 C were found to be 152 and 110, respectively, with the discharge capacity retaining rate (%) at 10 C being 72; thus, the discharge capacity and the discharge capacity retaining rate were high.

Production Example 1 (Production of Laminate Film)

(1) Production of Coating Slurry

After 272.7 g of calcium chloride had been dissolved in 4200 g of NMP, to this was added 132.9 g of paraphenylene diamine and completely dissolved therein. To the resultant solution was gradually added 243.3 g of terephthaloyl dichloride to be polymerized so that para-aramide was obtained, and this was further diluted with NMP so that a para-aramide solution (A) having a concentration of 2.0% by weight was obtained. To the resultant para-aramide solution (100 g) were added 2 g of an alumina powder (a) (alumina C, manufactured by Japan Aerosil Inc., average particle diameter: 0.02 μm) and 2 g of an alumina powder (b) (Sumicorundum AA03, manufactured by Sumitomo Chemical Co., Ltd., average particle diameter: 0.3 µm), that is, the total of 4 g, and mixed therein as fillers, and this was processed by a nanomizer three times, and further filtered by a wire gauze with 1000 meshes, and then defoamed under reduced pressure so that a coating slurry (B) was produced. The weight of the alumina powder (filler) relative to the total weight of the paraamide and the alumina powder was 67% by weight.

(2) Production and Evaluations of Laminate Film

As a porous film, a polyethylene porous film (film thickness: 12 µm, gas permeability: 140 seconds/100 ccs, average pore diameter: 0.1 µm, rate of porosity: 50%) was used. The polyethylene porous film was secured onto a PET film having a thickness of 100 µm, and the coating slurry (B) was applied onto the porous film by using a bar coater manufactured by Tester Sangyo Co., Ltd. The PET film and the coated porous film were immersed into water while being integrally kept so that a para-aramide porous film (heat resistant layer) was deposited thereon, and the solvent was then dried so that a laminate film 1 having the heat resistant porous layer and the porous film stacked thereon was obtained. The laminate film 1 had a thickness of 16 µm, and the paraamide porous film (heat resistant porous layer) had a thickness of 4 µm. The laminate film 1 had a gas permeability of 180 seconds/100 ccs, and a rate of porosity of 50%. When the cross section of the heat resistant porous layer in the laminate film 1 was observed by a scanning electron microscope (SEM), it was found that comparatively small fine pores in a range from about 0.03 µm to 0.06 µm and comparatively large fine pores in a range from about 0.1 µm to 1 µm were present. The evaluations on the laminate film were carried out by the following method.

<Evaluations of Laminate Film>

(A) Thickness Measurements

The thickness of the laminate film and the thickness of the porous film were measured in accordance with JIS Standard (K7130-1992). Moreover, a value obtained by subtracting the thickness of the porous film from the thickness of the laminate film was used as the thickness of the heat resistant porous layer.

(B) Measurements of Gas Permeability by Gurley Method

The gas permeability of the laminate film was measured in accordance with JIS P8117 by using a digital timer-type Gurley type Densometer manufactured by Yasuda Seiki Seisakusho Ltd.

(C) Rate of Porosity

The sample of the resulting laminate film was cut out into a square having a length of 10 cm in each side, and the weight W(g) and the thickness D (cm) were measured. The weights of the respective layers in the sample (Wi(g); i is an integer from 1 to n) were obtained, and based upon Wi and the true specific gravity (true specific gravity i (g/cm³)) of the material of each layer, the volume of each of the layers was obtained, and the rate of porosity (% by volume) was calculated from the following expression:

Rate of porosity (% by volume)=100×{1−(W1/True Specific Gravity 1+W2/True Specific Gravity 2+ . . . +Wn/True Specific Gravity n)/(10×10×D)}

In each of the examples, by using the laminate film obtained from Production Example 1, a lithium secondary battery capable of increasing the thermal film-rupturing temperature can be obtained.

INDUSTRIAL APPLICABILITY

The present invention can provide a nonaqueous electrolyte secondary battery having improved secondary battery characteristics such as a cycling behavior. Moreover, it is also possible to obtain a nonaqueous electrolyte secondary battery that exerts a high discharge capacity retaining rate at a high current rate, and in particular, the secondary battery is extremely usable for applications in which a high discharge capacity retaining rate at a high current rate is required, that is, usable as a nonaqueous electrolyte secondary battery for automobiles and power tools such as electric tools.

The invention claimed is:

1. A lithium mixed metal oxide comprising nickel, cobalt, and manganese, having a BET specific surface area of from 5.1 m²/g to 15 m²/g, and having an average particle diameter within a range of 0.1 µm or more and 0.8 µm or less, the diameter determined by a laser diffraction scattering method,
   wherein the average particle diameter is the average diameter of primary particles and secondary particles in the lithium mixed metal oxide;
   wherein the lithium mixed metal oxide has an average primary particle diameter of from 0.05 µm to 0.4 µm; and
   wherein the lithium mixed metal oxide is represented by the following formula (A):

$$Li_a(Ni_{1-(x+y)}Mn_xCo_y)O_2 \tag{A}$$

wherein, $1.04 \leq a \leq 1.3$, $0.3 \leq x \leq 0.6$, $0.01 \leq y \leq 0.4$, and $0.31 \leq x+y \leq 0.7$.

2. An electrode comprising the lithium mixed metal oxide according to claim 1.

3. A nonaqueous electrolyte secondary battery comprising the electrode according to claim 2 as a positive electrode.

4. The nonaqueous electrolyte secondary battery according to claim 3 further comprising a separator.

5. The nonaqueous electrolyte secondary battery according to claim 4, wherein the separator is a laminate film which has a heat resistant porous layer and a porous film that contains a thermoplastic resin laminated to each other.

* * * * *